United States Patent
Wagner et al.

(10) Patent No.: US 6,886,776 B2
(45) Date of Patent: May 3, 2005

(54) VTOL PERSONAL AIRCRAFT

(75) Inventors: Joseph Wagner, Ozark, AL (US); Anthony Pruszenski, Jr., Newburyport, MA (US); Karl F. Milde, Jr., 752 Union Valley Rd., Mahopac, NY (US) 10541

(73) Assignee: Karl F. Milde, Jr., Mahopac, NY (US)

( * ) Notice: Subject to any disclaimer, the term of this patent is extended or adjusted under 35 U.S.C. 154(b) by 208 days.

(21) Appl. No.: 10/242,036

(22) Filed: Sep. 11, 2002

(65) Prior Publication Data

US 2003/0085319 A1 May 8, 2003

Related U.S. Application Data

(63) Continuation-in-part of application No. 10/114,754, filed on Apr. 2, 2002, which is a continuation-in-part of application No. 09/968,934, filed on Oct. 2, 2001.
(60) Provisional application No. 60/354,808, filed on Feb. 6, 2002.

(51) Int. Cl.[7] .............................................. B64C 29/00
(52) U.S. Cl. ..................................... 244/12.4; 244/12.1
(58) Field of Search .............................. 244/12.5, 12.2, 244/12.3, 23 R, 23 C, 23 D, 12.1, 12.4; 60/232, 230, 226.1

(56) References Cited

U.S. PATENT DOCUMENTS

| | | | |
|---|---|---|---|
| 2,673,051 A | * 3/1954 | Frost | ........................... 244/139 |
| 3,599,901 A | 8/1971 | Relkin | ....................... 244/12 B |
| 3,614,030 A | 10/1971 | Moller | ........................ 244/12 |
| 3,618,875 A | * 11/1971 | Kappus | ...................... 244/12.3 |
| 3,640,489 A | 2/1972 | Jaeger | |
| 3,863,869 A | 2/1975 | Bachman | ..................... 244/23 |
| 4,049,218 A | 9/1977 | Wen | |
| 4,071,207 A | 1/1978 | Piasecki et al. | ................ 244/23 |

(Continued)

FOREIGN PATENT DOCUMENTS

| | | | |
|---|---|---|---|
| EP | 0 869 058 | 10/1998 | |
| EP | 869058 A2 | * 10/1998 | ........... B64C/25/56 |
| GB | 2198400 | 6/1988 | |
| GB | 2209314 A | * 5/1989 | ........... B64C/29/00 |
| GB | 2209314 | 10/1989 | |

OTHER PUBLICATIONS

Skyaid.org, and http://www.macroindustries.com/website/files/skyrider/_1024/index_main.htm.*
firebox.com, Moller skycar M400.*
Rockwell/DASA X–31A EFM.*
Online Documents from www.vtol.org.
Aircraft–Fixed–Wing–Military, International, Jane's All The World's Aircraft 1996–1997, :Rockwell/DASA, Jul. 15, 1996.

*Primary Examiner*—Peter M. Poon
*Assistant Examiner*—Timothy D Collins
(74) *Attorney, Agent, or Firm*—Milde & Hoffberg, LLP

(57) ABSTRACT

A personal aircraft (PAC) capable of vertical take-off and landing (VTOL) comprises a fixed wing and a fuselage with a passenger compartment having a front, a rear and two sides, and a plurality of independently powered thrusters, preferably integrated into the wing, on each side of the fuselage. The aircraft has a lift to drag ratio equal to or greater than 2. The thrusters, which are ducted fan units capable of providing a vertically upward force to the aircraft, are provided with such redundancy that the aircraft can hover with at one thruster inoperative on each side of the fuselage. At least one thruster on each side of the fuselage preferably comprises a "levitator" which creates lift from the airfoil-like air inlet as well as from the acceleration of air from inlet to outlet.

62 Claims, 25 Drawing Sheets

U.S. PATENT DOCUMENTS

| | | | |
|---|---|---|---|
| 4,202,518 A | 5/1980 | Burnham et al. ........... 244/12.1 |
| 4,230,292 A | 10/1980 | Van Nimwegen ............ 244/23 |
| 4,457,476 A | 7/1984 | Andresevitz ................. 244/23 |
| 4,537,372 A | 8/1985 | Forizs |
| D292,194 S | 10/1987 | Moller ......................... D12/5 |
| 4,795,111 A * | 1/1989 | Moller .................... 244/23 C |
| 4,898,343 A * | 2/1990 | Kamo ....................... 244/12.4 |
| 4,901,947 A | 2/1990 | Raymer |
| D312,068 S | 11/1990 | Moller ...................... D12/326 |
| 4,979,698 A | 12/1990 | Lederman |
| 5,115,996 A * | 5/1992 | Moller ..................... 244/12.5 |
| 5,178,344 A | 1/1993 | Dlouhy |
| 5,213,284 A | 5/1993 | Webster ....................... 244/23 |
| 5,244,167 A | 9/1993 | Turk et al. |
| 5,275,356 A | 1/1994 | Bollinger et al. |
| 5,320,305 A | 6/1994 | Oatway et al. |
| 5,381,985 A | 1/1995 | Wechsler et al. |
| 5,419,514 A * | 5/1995 | Ducan ....................... 244/12.4 |
| 5,454,531 A | 10/1995 | Melkuti |
| 5,481,868 A | 1/1996 | Davies et al. |
| 5,653,404 A | 8/1997 | Ploshkin .................... 244/12.2 |
| 5,687,934 A | 11/1997 | Owens |
| 5,758,844 A * | 6/1998 | Cummings ................. 244/7 C |
| 5,765,783 A | 6/1998 | Albion |
| 5,823,468 A | 10/1998 | Bothe |
| 5,842,667 A | 12/1998 | Jones |
| 5,881,970 A | 3/1999 | Whitesides ................. 244/23 |
| 5,895,011 A | 4/1999 | Gubin |
| 6,065,718 A | 5/2000 | Piasecki |
| 6,105,364 A | 8/2000 | Zdybel |
| 6,170,778 B1 | 1/2001 | Cycon et al. |
| 6,179,247 B1 | 1/2001 | Milde, Jr. ................. 244/23 A |
| 6,227,483 B1 | 5/2001 | Therriault |
| 6,270,038 B1 | 8/2001 | Cycon et al. |
| 6,340,133 B1 | 1/2002 | Capanna |
| 6,375,117 B1 | 4/2002 | Cain |
| 6,382,556 B1 | 5/2002 | Pham |

* cited by examiner

VTOL PERSONAL AIRCRAFT

CROSS-REFERENCE TO RELATED APPLICATION

This application is a continuation-in part of application Ser. No. 10/114,754 filed Apr. 2, 2002, which, in turn is a continuation-in-part of application Ser. No. 09/968,934 filed Oct. 2, 2001. This application also claims subject matter disclosed in the provisional patent application Ser. No. 60/354,808, filed Feb. 6, 2002.

BACKGROUND OF THE INVENTION

There is one major industry which has been predicted and anticipated for many years, but has yet to materialize: the production and sale of small, affordable, vertical take-off and landing (VTOL) aircraft, called a "Personal Aircraft" or "PAC" for short. The present invention relates to the fundamental characteristics of this craft.

Since the appearance of the ubiquitous automobile, people have simply assumed that an inexpensive, easy to fly, VTOL aircraft would someday be in our future. As early as 1926, no less a visionary and hard-nosed businessman than Henry Ford himself attempted to develop the "Ford flying flivver" but the technology of the day was simply not up to the task.

Initially it was thought that the helicopter, developed by Igor Sikorsky, would become the personal mode of transportation envisioned by Henry Ford, but for several reasons it has remained a special-purpose aircraft. Principally due to its control system, which includes a complex mechanism for continuously adjusting the pitch of individual rotating blades, the helicopter is extremely expensive to construct and to maintain. It is also not possible to provide redundancy so that failure of any drive element can result in a crash. Further, the helicopter is notoriously difficult to fly.

Prof. Paul Moller has for many years been developing what he calls a "SkyCar": a two or four-place PAC which utilizes "ducted fans" for both lift and horizontal flight. Using four Wankel engines developing 650 horsepower on take-off and about 200 Hp for level flight, the craft is designed for a cruising speed of 300 MPH.

Although the SkyCar may have certain advantages over a helicopter, it requires all four of its Wankel engines to operate properly at all times to remain airworthy. Another disadvantage is its relatively high rate of fuel consumption, both while hovering and in forward, horizontal flight, as compared to a helicopter. Its major problem is that, in replacing a helicopter's "rotary wings" with small ducted fans, it requires approximately four times the horsepower to maintain it aloft, in the hover mode.

As this term is used herein, a "ducted fan" is simply a device for accelerating air as it passes through a duct or shroud. The duct serves primarily to limit radial flow outwards from the hub to the blade tip, thereby increasing the axial flow of air through the duct and increasing the "thrust", which is the force of reaction to the acceleration of air, as compared to a non-ducted fan or propeller. The air is accelerated through the duct by a multi-bladed fan or "impeller" and the swirl, or rotational component if the flow, is usually converted back to axial flow by a further row of blades which are stationery and hence referred to as the "stator". Alternatively, the rotational component may be converted back to axial flow by a second impeller rotating n the opposite direction from the first impeller.

The static thrust T (in pounds) of a ducted fan unit with a single impeller is given approximately by the formula:

$$T = 13(E \times Hp \times d)^{2/3}, \quad (1)$$

where E is the efficiency of the ducted fan (anywhere from 0 to 1 for 0% to 100%), Hp is the horsepower of the engine driving the impeller (in bhp), and d is the ducted fan outlet diameter (in feet).

If the impeller efficiency is assumed to be $2/3$ (0.67), and the fan outlet diameter 1.5 feet, then E×d=1, and the formula reduces to:

$$T = 13 \, Hp^{2/3}.$$

To lift 2000 pounds with four ducted fan units, as does the Moller SkyCar, each unit must develop at least 500 pounds of thrust. Setting T=500, $$Hp^{2/3} = 500/13 = 38.46,$$

$$Hp = 168.6 \text{ bhp}.$$

Therefore a fully loaded 2000 pound SkyCar provided with four ducted fan units can lift off vertically and hover if each ducted fan is driven with an engine developing 168.6 brake horsepower. The total horsepower requirement is therefore approximately 168.6×4 or 675 Hp. This is about four times the engine horsepower requirement for a light (two-place) helicopter. In addition to the expense and weight of the engines, the fuel burn rate required to develop for such horsepower is extremely high, as compared to a helicopter, and gives rise to the need for a more efficient design.

SUMMARY OF THE INVENTION

A principal object of the present invention is to provide an aircraft configuration which is potentially less costly to construct, and substantially safer and less expensive to fly, than either the Sikorsky helicopter or the Moller SkyCar.

A more particular object of the present invention is to provide a thruster for an aircraft in the form of a ducted fan unit which is more efficient, and provides greater lift per horsepower, than thrusters heretofore known.

A still further object of the present invention is to provide an aircraft having an efficient fixed wing for forward, horizontal flight, with integrated, highly efficient thrusters for forward propulsion as well as vertical take-off and landing.

These objects, as well as further objects which will become apparent from the discussion that follows, are achieved, in accordance with the present invention, by providing an aircraft with at least one fixed wing, a fuselage arranged centrally on the wing, and at least one thruster disposed on each side of the fuselage, arranged in and integrated into the fixed wing. The craft is designed so that its combined body/wing lift to drag ratio (L/D) exceeds 2:1.

The ducted fan unit used in the aircraft, which is called the "levitator", is preferably of a design that increases the static trust, and thus increases the efficiency and reduces the weight, as compared to a conventional ducted fan unit. This increased efficiency reduces the fuel burn rate required for hovering, thus reducing the amount of fuel required to be carried on board and, in turn, further reducing the weight of the aircraft that must be lifted by the levitators.

While the present invention is applicable to all types and sizes of aircraft, it is particularly suited to the small, low-speed Personal Aircraft (PAC). In designing the personal aircraft (PAC) according to the invention, a number of design assumptions have been made:

1. The craft is capable of carrying three 200 pound people, including the pilot.
2. The craft is capable of vertical take-off and landing (VTOL).
3. For increased safety, the craft should be capable of flying and landing with at least one duct fan unit inoperative.
4. The craft has a lifting body/wing design which allows operation with less than fifty percent full power in forward flight. This requires a lift to drag ratio (L/D) greater than 2:1. Preferably, the lift to drag ratio of the aircraft is in excess of 4:1 (requiring less than 25% power to maintain level forward flight) and, for the preferred embodiment of the Personal Aircraft (PAC) according to the present invention, the L/D is in the range of 4:1 to 10:1.
5. The craft is capable of carrying enough fuel for 30 minutes of tale-off and landing time and 100 minutes of forward travel time.

The preferred embodiment of the PAC according to the invention is designed to carry a payload of 600 pounds in the airspace of 1000 to 5000 feet above the terrain at a cruising speed of 50 to 100 MPH, and top speed in the range of 100 to 200 MPH.

The PAC is powered by multiple thrusters: highly fuel-efficient, ducted fan units. In a preferred embodiment of the invention, if a thruster fails, the craft can still be flown and landed safely. Either the thrusters are manually controlled or an electronic control system can adjust the throttles of the remaining thrusters to maintain level flight in the event of such a power failure.

The PAC and its thrusters are uniquely designed to minimize the fuel burn rate required to maintain lift, both when hovering and when moving horizontally. During hovering, vertical lift is obtained from the flow of air over airfoil surfaces at the inlets to the ducted fan units, as well as from the reaction to downward acceleration of the air through the ducts. During forward motion lift is obtained primarily from the airfoil surfaces on a conventional wing while the thrusters provide forward force to overcome aircraft drag.

Ducted Fan "Levitator": The objective of the "levitator" design is to provide an optimized "thruster" for the Personal Aircraft (PAC), which is capable of vertical takeoff and landing (VTOL), hovering, and forward flight at cruising speeds of approximately 50 to 100 mph. This aircraft is intended to be stable in all flight modes, easily controllable, durable, and as safe as possible for its pilot and passengers.

The name given to the PAC thruster is "levitator". This name was chosen because the fundamental design—consisting of a combination of ducted fan elements and elements of "channel wing" and "box wing" aircraft—is primarily intended as a lift producer.

Conventional ducted fan units are designed as thrust producers. Their thrust output can be aligned in any desired direction, but it is generally limited to the direct reaction force produced from the axial air mass acceleration that takes place within the duct.

In this respect a ducted fan closely resembles a propeller. It produces thrust in the direction of its centerline.

The levitator works somewhat differently. Its impeller does produce a thrust output in the direction of its rotational centerline, like a propeller or ducted fan unit, but in addition, its inlet passageways are so shaped that the incoming air passing over their horizontal surfaces generates "induced lift".

In this respect, the levitator somewhat resembles an airplane, in that the propeller's action in moving the aircraft forward induces airflow over substantially horizontal aerodynamic surfaces, and lift is thereby generated.

The levitator design makes use of the aerodynamic advantages of "channel wing" and "box wing" aircraft. That is, like channel wings and box wings, the levitator produces lift via forced airflow over airfoil-shaped, substantially horizontal surfaces equipped with "end plates" to prevent adverse "tip conditions" such as stalling and lift reduction, particularly at high angles of attack.

The levitator avoids most aerodynamic disadvantages of channel wings and box wings because of its confined airflow paths. Inlet airflow through the levitator is essentially linear and non-turbulent; and because all of this flow is dynamically induced by the internal impeller (rather than being at least partly a collateral effect from forward motion of the vehicle) the lifting power is substantially independent of the aircraft velocity.

In addition, the levitator design largely overcomes a significant limitation of lift generation via conventional aircraft wings; namely flow separation from the surface over the aft upper airfoil contour at high angles of attack. This is the major cause of stalls in airplanes. Stalling is eliminated in the levitator design by its inlet duct configuration and the fact that airflow over the interior surfaces is compelled to follow the passage curvature, having no other available flow path. Thus the lift forces (generated by angular downward acceleration of the air stream, in conjunction with the Coanda Effect which assures that the airflow follows the inlet surfaces) are essentially independent of attack angle. Given optimally-curved inlet surfaces (to eliminate inlet stall), the levitator's induced lift is affected only by the rate of rotation (r.p.m.) of its impeller, plus variations in atmospheric density.

The levitator also produces both lift and directional thrust by impeller-induced acceleration of its internal air stream. Since both of these are vector resultants of the axial acceleration produced by the whirling impeller, their magnitude and direction are functions not only of the impeller speed, but also of the angular orientation of the levitator unit as a whole (both in its static mounted position and its relative variations from that caused by flight maneuvering) plus the orientation of its controllable, variable-angle airflow outlet.

As an example of how these effects can interact in flight, consider a levitator-powered PAC flying forward, approaching its desired landing spot. Its forward velocity can be arrested for a vertical landing in two ways, used separately or together.

1. The levitator outlet ducts can be diverted from their normal down-and-rearward alignment to a down-and-forward angled position. Thus, their "directional vector force" will tend to retard, and eventually stop, forward progress of the PAC.
2. The entire PAC can be tilted "nose-up". This slows the aircraft in two simultaneous ways independent of, and in addition to, lift and drag effects on the PAC's wing surface: The induced lift vectors of the levitator inlets tilt rearwards, causing a motion-retarding effect, and the dynamic lift vectors of the levitator impeller axes tilt to a more forward orientation, adding to the retarding effect caused by deflection of the flow outlet ducts.

To summarize: The levitator is a dual-acting lift-producing unit. It generates appreciably more lift with the same (or less) power than a conventional ducted fan unit because of the mechanical advantages of generating Coanda-effect lift from the deflection of its inlet airflow, in addition to the direct mass-acceleration reaction force exerted through the impeller action.

To clarify this advantage by analogy: the famous Piper J-3 Cub is a 2-seater airplane weighing 1220 pounds fully loaded. Its usual power is rated at 65 bhp, turning a 6-foot diameter propeller at 2300 rpm. This engine/propeller system cannot lift the aircraft vertically, by direct thrust alone. However, when the engine's thrust is used to move the Cub's wing surfaces forward through the air, the resulting induced lift is ample to lift the 1220-pound aircraft upwards at 450 feet per minute. This "leverage" is called the "lift to drag ratio", which for the Cub is approximately 10:1.

Looked at in still another way, the lift-producing capacity of the levitator is greater than that of a conventional ducted fan unit in essentially the same way that a given amount of force can move a much heavier weight upward by pushing it along a slanting ramp, than it can by direct lifting action.

Further Objectives and Features: It is a principal object of the present invention to improve the fuel efficiency of a vertical take-off and landing (VTOL) aircraft of the type described above.

It is a further object of the present invention to improve the safety of a VTOL aircraft of the type described above.

These objects, as well as other further objects which will become apparent from the discussion that follows, are achieved, in accordance with the present invention, by providing a personal aircraft (PAC) which comprises:

(a) a fuselage providing a passenger compartment, such fuselage having four sides: a front side, a rear side and two lateral sides; and (b) a plurality of independently powered thrusters attached to the fuselage, with at least two and preferably three or more thrusters disposed on two opposite sides of the compartment, to provide a vertically upward force to the fuselage.

In this way, if one of the thrusters on each side were to fail, the remaining thrusters would maintain the craft aloft.

According to a particular feature of the invention, the outlet of at least one of the thrusters on each side may be tilted to adjust the direction of force applied to the passenger compartment. In this way, either a forward or reverse force may be applied to the compartment in addition to the upwardly directed force.

According to a further feature of the invention, an additional independently powered thruster is attached to the compartment at the front, the rear, or both the front and rear, to exert a horizontal force to the compartment; e.g., in the forward direction.

According to another preferred feature of the present invention, the aircraft is provided with at least one substantially horizontal wing on each side of the passenger compartment to provide a lifting force during forward movement of the craft. Preferably, there are at least a pair of main wings plus a pair of control wings, such as a canard and/or rear stabilator.

According to still another preferred feature of the present invention, the PAC is provided with a parachute, attached to the top of the passenger compartment, and means for deploying the parachute in case of an emergency.

According to still another preferred feature of the present invention, the PAC is provided with a deployable airbag, attached to the bottom of the passenger compartment, and means for deploying the airbag in case of an emergency.

It is a further object of the present invention to provide a ducted fan unit which is particularly intended for use in a VTOL type of aircraft.

Existing ducted fan configurations provide more or less axial airflow paths and relatively high flow velocities. Their thrust output is in line with the center line of their impellers.

It is thus a specific object of the present invention to provide a ducted fan unit which is configured to provide maximum performance to an aircraft that is capable of vertical liftoff and landing and also a forward flight cruising speed of approximately 50 miles per hour. For this purpose, the output of the ducted fan unit must provide both sufficient vertical thrust to sustain the craft in flight, and a horizontal thrust component sufficient to propel the vehicle at its desired forward cruising speed.

These objects, as well as further objects which will become apparent from the discussion that follows, are achieved, in accordance with the present invention, by providing a ducted fan unit for a PAC, hereinafter sometimes called a "Levitator", which comprises:

(1) a cylindrical first tube having an inlet, an outlet and a linear, first central axis that is disposed at an angle to the vertical when the aircraft is oriented in its normal upright position such that the inlet is located forward of the outlet, in relation to the direction of travel of the aircraft;

(2) a first impeller disposed in the first tube and arranged to rotate about the aforesaid first central axis to generate airflow from the inlet to the outlet;

(3) a first prime mover coupled to drive the first impeller; and (4) a second tube having an inlet and an outlet, the outlet of the second tube having substantially the same internal cross-sectional area as that of the first tube, the outlet of the second tube extending into the inlet of the first tube, the inlet of said second tube facing forward in relation to said direction of travel and having a substantially horizontal, second central axis.

The prime mover which drives the first impeller is preferably disposed in the first tube adjacent to this impeller. Advantageously, the prime mover is mounted on a plurality of stator blades which constrain the air to flow through the first tube in the direction of the first central axis.

The prime mover utilized in the ducted fan unit may be any type of engine or motor, such as an internal combustion engine (two cycle, four cycle, gasoline, diesel or the like), a turbo jet engine, or turboprop, or even an electric motor. In the latter case, a separate motor-generator, solar cell, fuel cell or battery, is provided on the aircraft to generate the electricity to power the electric motors of the several thrusters.

If the prime mover is an internal combustion engine, it is advantageous if the intake port, for the aspiration of air into the internal combustion engine, be disposed outside of the first tube; that is, outside the turbulent rush of air within the tube.

According to a further feature of the invention, the ducted fan unit also comprises a third tube having an inlet, which has substantially the same internal cross-sectional area as that of the first tube, attached to the outlet of the first tube. The outlet of the third tube, which may be (but does not have to be) circular in cross section, has a third central axis. The third tube has a flexible or articulated portion arranged between its inlet and outlet to allow for the adjustment of the orientation of the third central axis with respect to that of the first central axis. This allows the "exhaust" of the ducted fan unit to be aimed in a desired direction.

Preferably, the first axis is disposed at an angle to the vertical in range of 0 to 90°, preferably 15 to 35°, with the most desirable angle being substantially 26°. The third central axis can be oriented preferentially in alignment with the first central axis, but it can also be adjusted to direct the outflow of air at a different angle.

Advantageously, the ducted fan unit may also have a second impeller to increase the speed of the air at the outlet of the first tube. Preferably, the second impeller is rotated in a direction opposite to that of the first impeller so as to redirect the air to flow in an axial direction within the first tube. Either the first prime mover may drive both the first and second impeller, or a separate, second prime mover may be coupled to drive the second impeller.

The inlet of the second tube may have a circular opening, but, according to a further feature of the present invention, the second tube has a substantially rectangular opening with upper and lower substantially horizontal edges and two side edges (which may be substantially linear and vertical). The upper edge and/or the lower edge of the opening of the second tube is/are advantageously provided with an aerodynamic contour which produces lift due to the airflow into such inlet.

According to still another feature of the present invention, the face of the inlet of the second tube, which is defined by the edge surrounding the inlet opening, has a substantially planar configuration which forms an acute angle with respect to the second central axis. Advantageously, this acute angle is in the range of 0 to 90°, preferably 35 to 55°, with the preferred angle being substantially 45°. This acute angle facilitates the entry of air, no matter whether the PAC is traveling in the upward and/or the forward direction.

The ducted fan unit according to the invention thus combines several desirable features for the efficient propulsion of a VTOL aircraft (PAC):

1. A non-linear airflow path, configured in such a way as to produce both static and dynamic lift plus forward thrust;
2. An inlet shape and contour configured in such a way as to minimize the incidence of "inlet stall" and air turbulence, and thus minimize unintended variations in thrust output from the "negative feedback" characteristics of decreased air density due to these factors;
3. An outlet configuration that permits controlled deflection of the exit airflow, to provide directional control in flight; and
4. An impeller design and power source designed for relatively high-volume, relatively low-velocity airflow, in order to maximize propulsive efficiency.

The objectives of the invention, stated above, are met by a combination of these design features.

One particularly significant design feature of the ducted fan unit (Levitator) is the angular orientation of the fan impeller axis. For example, with the impeller axis tilted 26° in a forward inclination, the vertical thrust component will equal approximately 90% of the gross thrust developed by the fan unit, while the horizontal component will equal approximately 44% of the gross thrust.

Another important feature of this design augments the vertical lift developed by the fan unit by means of the "Coanda Effect". The incoming airflow is redirected through a curved inlet passageway, whose surface curvature also functions in somewhat the same manner as lifting airfoil. In a preferred configuration, the leading surfaces of the intake opening are oriented substantially in a horizontal direction. This minimizes the aerodynamic profile drag effect of the duct's cross section and also orients the inflow to provide a maximum reactive lifting effect on the duct surface, augmenting the lifting thrust produced directly by the impeller.

A further advantage of this general configuration is that it makes possible multiple inlets, enabling it to supply air to multiple ducted fan units (Levitators) in a single vehicle. The multiple inlets can be "siamesed", either vertically or horizontally, to provide minimum interference to the incoming air and maximum intake airflow to all the ducted fan units.

In connection with the duct configuration described above, the duct passage needs to be circular in cross-section only at the impeller. As noted above, the preferred cross-sectional shape for the duct inlet passage is substantially rectangular (although non-rectangular—e.g. circular or oval—inlets can be used). This rectangular shape transitions gradually to a circular one at the impeller.

Because the primary intended use of this ducted fan design is in a VTOL aircraft (PAC), the orientation of the actual intake opening (as distinct from the inlet passage behind it) should preferably be at an angle of between 35° and 55° to the vertical. This is to provide minimal interference to the incoming airflow when the aircraft is in either a vertical or a horizontal mode of flight.

The outflow or third section of the duct is preferably circular in cross-section, and contains a flexible "bellows" segment, or an articulated section, which enables the outflow to be diverted in any desired direction, as a means of flight path control.

Existing ducted fans in general are relatively low in propulsive efficiency. To improve performance in the ducted fan unit according to the invention, the following features are contemplated:

(1) The intake air for the prime mover in the unit is preferably taken from a "static source" or plenum outside the duct, so as to maximize the density of the combustion air; and (2) The impeller blades are preferably made with glass-smooth rear surfaces, but with matte front surfaces on the forward 30% of the blade chord.

In the application for which ducted fan unit is intended, there are no inherent restrictions on impeller diameter since the PAC is not intended for high speed flight. Therefore, to maximize efficiency (and thus to reduce the fuel load required to provide a reasonable cruising range) the duct diameter is preferably made as large as practicable. This improves flow efficiency by maximizing the mass of the airflow and minimizing excess "slipstream" velocity.

Since the design performance of the PAC is known (or can be estimated), standard propeller selection criteria can be usefully employed in the design of the impeller for this ducted fan unit. In fact, the unit may be designed to be closer to a "shrouded propeller" than to the usual ducted fan, resulting in a further gain in efficiency.

In summary, the present invention provides a personal aircraft (PAC) which combines a number of salient features that increase safety, stability and efficiency. These features include:

(1) Multiple ducted fan units, each with a separate prime mover, to provide lift.

(2) Ducted fan units of a particular advantageous design which matches the VTOL and low cruising speed requirements of a PAC.

(3) Contoured inlets to the ducted fan units to maximize static thrust and minimize the interference between adjacent ducts and forward motion.

(4) Control of the thrust produced by the individual ducted fan units by controlling one or more of the following:
  output power of the prime mover(s) in each unit;
  impeller blade pitch;
  inlet or outlet vectoring; and
  inlet or outlet area variation.

(5) Providing auxiliary lifting control surfaces in the form of canards, rear elevators or stabilators.

(6) A control system which provides vehicle stability during normal operation as well as during partial or full engine failure in one or more of the ducted fan units.

(7) A recovery system in the form of a parachute or deployable lifting-drag surfaces in the event of catastrophic engine failure.

(8) An inflatable airbag to absorb low-level drop height energy due to engine failure.

(9) A suitable operator interface to allow safe operation and navigation.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
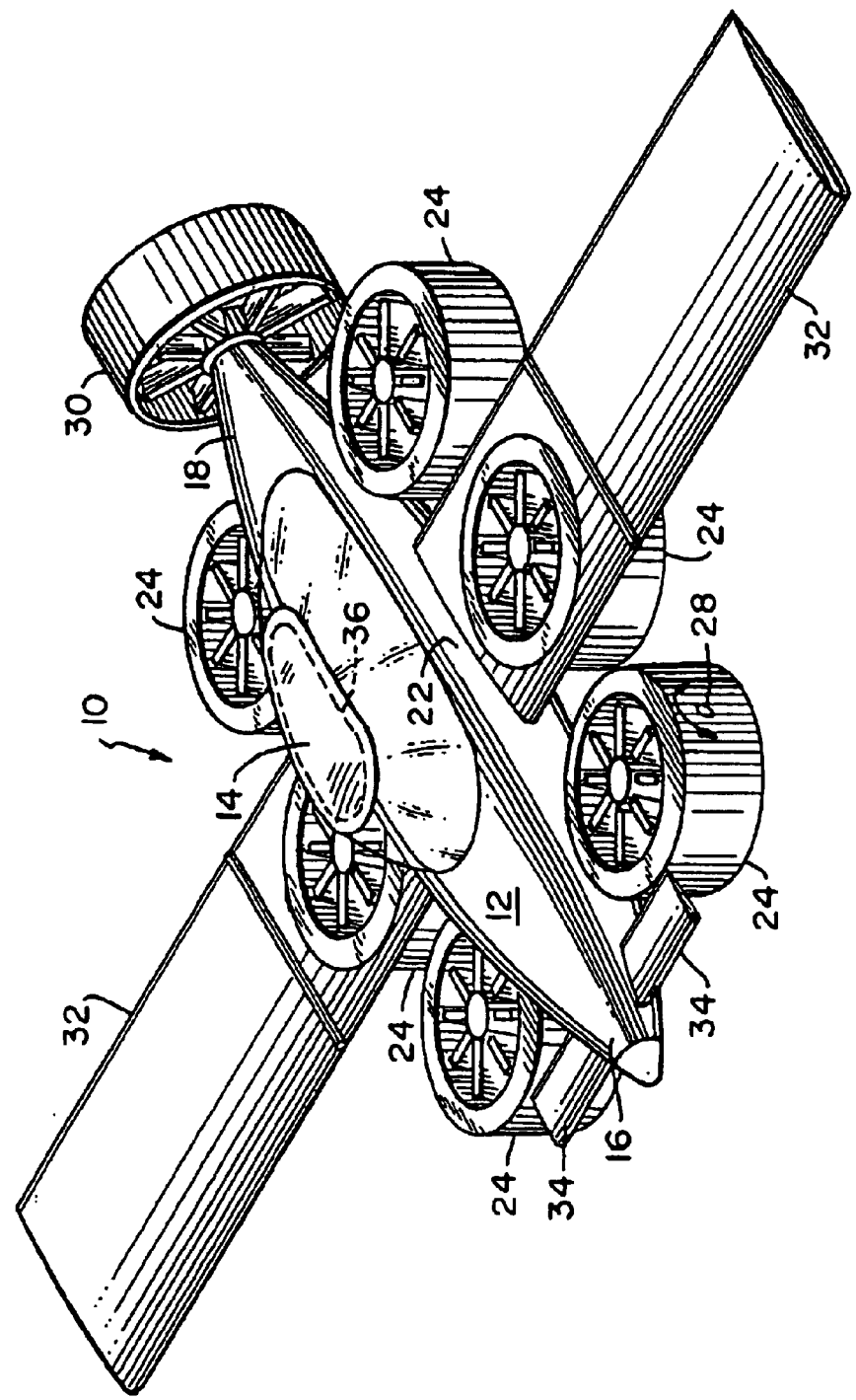
FIG. 1 is a perspective view of a first preferred embodiment of a personal aircraft (PAC) according to the present invention.

The preferred embodiments of the present invention will now be described with reference to FIGS. 1–35 of the drawings. Identical elements in the various figures are identified with the same reference numerals.

Power Requirements for VTOL Aircraft: The utilization of ducted fans in a VTOL aircraft makes it possible to considerably reduce the "footprint" of the craft as compared with a rotary winged helicopter. By utilizing multiple ducted fans (three or more on each side of the aircraft) it is possible to simplify the means of control, provide increased stability of the aircraft and also to provide increased safety in the event that one or more of the ducted fan units should become inoperative while in flight.

The utilization of a fixed wing on a VTOL aircraft makes it possible to fly efficiently from point A to point B; that is, to utilize 50% or less of the total power available for vertical take-off and landing during the forward, horizontal flight mode. The percent reduction in power for forward flight, as compared with stationary "hovering", is dependent upon the lift to drag (L/D) ratio of the aircraft.

The total horsepower required for vertical take-off and landing may be calculated using the formula (1) for thrust T set forth above. As will be noted from this formula, the trust depends entirely upon the efficiency of the ducted fan, the engine horsepower available to drive the ducted fan and the diameter of the fan outlet.

In calculating the required thrust to lift a PAC, it will be assumed that the efficiency is 85% or 0.85. This efficiency is achievable with present, state-of-the-art ducted fan units.

In an aircraft with two or more ducted fan units on each side, it is assumed that if a ducted fan unit on one side becomes inoperative, it will be necessary, for control purposes, to disable the mirror-imaged ducted fan unit on the opposite side (or at least to reduce the power of all ducted fan units on this opposite side to reach the same state of equilibrium). Consequently, the total thrust for the aircraft must be calculated, for safety's sake, for the situation where two ducted fans (one on each side) are inoperative.

Finally, in order to operate a ducted fan at full efficiency, the maximum speed of the propeller tips should be no greater than 0.7 times the speed of sound. Higher propeller speeds require the application of considerably more horsepower (and thus with reduced efficiency) to achieve the desired result: namely, thrust.

Table I below sets forth the formulae used in a thrust calculation for the case where the ducted fan outlet is 48 inches or 4 feet in diameter, and the engine drives the ducted fan impeller with 50 horsepower.

For this example, it is assumed that there are a total of six ducted fans on the aircraft (three on each side of the fuselage). If two ducted fans are inoperative (one on each side) the craft must be designed for vertical take-off and landing with only four ducted fan units.

Hence, the thrust which is calculated for a single ducted fan (D1 in the formulae of Table I) is multiplied by four to give the total thrust (T2). In this case, the total thrust T2 is 1,596 pounds.

Tables II and III set forth the total lift available for the aircraft for a total of six and eight ducted fan units, respectively. Each Table gives the thrust available at sea levels for various ducted fan outlet diameters for the situation where each ducted fan is operated with 50 horsepower or, alternatively, 100 horsepower.

Considering Table II, it may be seen that there are two configurations which provide more than 300 pounds of thrust to lift a payload. These are:

(1) At 50 horsepower, the ducted fan units have an outlet with at least a five-foot diameter.

(2) At 100 horsepower, the ducted fan units have an outlet with at least a three-foot diameter.

In the case where there are a total number of eight ducted fan units, a 300 pound or greater payload may be lifted with the following two configurations:

(1) With a 50 horsepower engine, the ducted fan units have an outlet with at least a 40 inch diameter.

(2) If 100 horsepower is available, the ducted fan units have an outlet with at least a 26 inch diameter.

Tables II and III show duoted fan unit diameters in the range of 2 to 5 feet, yielding a permissible maximum speed of between about 7,500 RPM and 3,000 RPM, respectively.

TABLE I

| Formula | Description |
|---|---|
| $din := 48$ | Exit Duct Diameter, inches. |
| $d := \dfrac{din}{12}$ | Exit Duct Diameter, Feet. $d = 4$ |
| $E := .85$ | Current state of the art for duct efficiency $0 < E < 1.0$ |
| $N := 6$ | Number of Ducts. |
| $Hp := 50$ | Fan Horsepower, Hp. |
| $Hpft := Hp \cdot 550$ | Fan Horsepower, Ft-Lb/sec. $Hpft = 27500$ |
| $\rho := .0765$ | STD Atmosphere density, Lbm/Ft^3, 29.92 hg, @ 58.7 F. |
| $s := \dfrac{760.988}{60}$ | $s = 1115.99$ Speed of Sound, Ft/sec. @ STD Sea Level |
| $T1 := 13 \cdot (E \cdot Hp \cdot d)^{2/3}$ | Thrust equation for sea level air. From Page 6 of Ducted Fans for Model Jets by David James. $T1 = 398.94$ Pounds Thrust per Duct. |
| $T2 := (N - 2) \cdot T1$ | Lift capability with 2 ducts out. $T2 = 1596$ |
| $A := d^2 \cdot \dfrac{\pi}{4}$ | Exit duct area. Square Feet. $A = 12.57$ |
| $dp := \dfrac{T1}{A}$ | Equivalent Pressure Increase across Disk, psf. $dp = 31.75$ |
| $dpsi := \dfrac{dp}{144}$ | Equivalent Pressure Increase across Disk, psi. $dpsi = 0.2205$ |
| $Vs := \sqrt{\dfrac{32.17 \cdot dp \cdot 2}{\rho}}$ | Exit Velocity at STD to produce dp in Ft/sec. $\dfrac{Vs}{E} = 92.24$ Assumes Uniform Distribution. & 100% efficiency. $Vs = 163.4$ |
| $Vsmph := \dfrac{Vs \cdot 60}{88 \cdot E}$ | $Vsmph = 131.07$ Exit Velocity (If Uniform) in MPH. Includes losses due to E. $Vsmph \cdot E = 111.41$ |
| $RPM := \dfrac{s \cdot .7 \cdot 60}{d \cdot \pi}$ | Maximum RPM for the Fan @ .7 Speed of Sound. $RPM = 3729.91$ |

TABLE II

Comparison of Fan Diameter versus Thrust.

| | |
|---|---|
| | Given: 3, 200 pound persons for a payload. |
| 6 | N, Number of Fan-ducts in vehicle for Vertical Lift. |
| 2 | A, Number of maximum disabled units to provide VTOL |
| 0.85 | Efficiency of Ducted Fan. Must be Between 0 and 1.00 |
| 0.0765 | Density in Lb/ft$^3$ of Air STD Atmosphere, 29.92 @ 58.7 F. |
| 0.45 | Lbs/Hp-Hr used by the prime mover at full thrust. |
| 5.86 | Pounds Mass per Gallon of Gasoline @ 20C Chem HDBK. |
| 100.00 | Range in minutes. Thirty minute of 100% power |

Fuel, Lbs, for 100 min @ 25% 30 min 2 100%.  293
50 Horse Power  For 100% Power Climb or Hove
per Fan-Duct  11.51  Gallons used in 30 minutes.

| Outlet Diameter in Inches | Outlet Diameter in Feet | Single Fan-Duct Thrust in Pounds | Minimum Sea-level Thrust, lbs available @ 100% with Failed Fans | Maximum RPM of Fan to Limit Tip Speed Below .7 Mach | Delta Pressure Across Disk in psi | Jet Velocity to Give the Same Stagnation Pressure in MPH with InEff | Fuselage Weight with 2 Lb/Hp Motors. Negative does not lift. LBS. |
|---|---|---|---|---|---|---|---|
| 24 | 2 | 251 | 1005 | 7460 | 0.556 | 208 | −487 |
| 30 | 2.5 | 292 | 1167 | 5968 | 0.413 | 179 | −326 |
| 36 | 3 | 329 | 1317 | 4973 | 0.324 | 159 | −175 |
| 48 | 4 | 399 | 1596 | 3730 | 0.220 | 131 | 103 |
| 60 | 5 | 463 | 1852 | 2984 | 0.164 | 113 | 359 |

Fuel, Lbs, for 100 min @ 25% 30 min 2 100%.  585
100 Horse Power  For 100% Power Climb or Hove
per Fan-Duct  23.03  Gallons used in 30 minutes.

| | | | | | | | |
|---|---|---|---|---|---|---|---|
| 24 | 2 | 399 | 1596 | 7460 | 0.882 | 262 | −189 |
| 30 | 2.5 | 463 | 1852 | 5968 | 0.655 | 226 | 67 |
| 36 | 3 | 523 | 2091 | 4973 | 0.514 | 200 | 306 |
| 48 | 4 | 633 | 2533 | 3780 | 0.350 | 165 | 748 |
| 60 | 5 | 735 | 2939 | 2984 | 0.260 | 142 | 1154 |

TABLE III

Comparison of Fan Diameter versus Thrust.

| | |
|---|---|
| | Given: 3, 200 pound persons for a payload. |
| 8 | N, Number of Fan-ducts in vehicle for Vertical Lift. |
| 2 | A, Number of maximum disabled units to provide VTOL |
| 0.85 | Efficiency of Ducted Fan. Must be Between 0 and 1.00 |
| 0.0765 | Density in Lb/Ft$^3$ of Air STD Atmosphere, 29.92 @ 58.7 F. |
| 0.45 | Lbs/Hp-Hr used by the prime mover at full thrust. |
| 5.86 | Pounds Mass per Gallon of Gasoline @ 20C Chem HDBK. |
| 100.00 | Range in minutes. Thirty minute of 100% power |

Fuel, Lbs, for 100 min @ 25% 30 min @ 100%.  390
50 Horse Power  For 100% Power Climb or Hove
per Fan-Duct  15.35  Gallons used in 30 minutes.

| Outlet Diameter in Inches | Outlet Diameter in Feet | Single Fan-Duct Thrust in Pounds | Minimum Sea-level, Thrust, lbs available @ 100% with Failed Fans | Maximum RPM of Fan to Limit Tip Speed Below .7 Mach | Delta Pressure Across Disk in psi | Jet Velocity to Give the same Stagnation Pressure in MPH with InEff | Fuselage Weight with 2 Lb/Hp Motors. Negative does not lift. LBS. |
|---|---|---|---|---|---|---|---|
| 38 | 3.166667 | 341 | 2048 | 4711 | 0.301 | 153 | 258 |
| 42 | 3.5 | 365 | 2190 | 4263 | 0.263 | 143 | 400 |
| 46 | 3.833333 | 388 | 2327 | 3892 | 0.233 | 135 | 537 |
| 48 | 4 | 399 | 2394 | 3730 | 0.220 | 131 | 604 |
| 52 | 4.333333 | 421 | 2525 | 3443 | 0.198 | 124 | 735 |

Fuel, Lbs, for 100 min @ 25% 30 min @ 100%.  780
100 Hours Power  For 100% Power Climb or Hove TABLE III-continued

| per Fan-Duct | | | | 30.70 | | Gallons used in 30 minutes. | |
|---|---|---|---|---|---|---|---|
| 24 | 2 | 399 | 2394 | 7460 | 0.882 | 262 | 214 |
| 30 | 2.5 | 463 | 2778 | 5968 | 0.655 | 226 | 598 |
| 36 | 3 | 523 | 3137 | 4973 | 0.514 | 200 | 957 |
| 48 | 4 | 633 | 3800 | 3730 | 0.350 | 165 | 1620 |
| 60 | 5 | 735 | 4409 | 2984 | 0.260 | 142 | 2229 |

First and Second Preferred Embodiments of the PAC: In the first embodiment of the invention, shown in FIGS. 1–4, the personal aircraft (PAC) 10 comprises a fuselage 12, forming a passenger compartment, having a top 14, a front 16, a rear 18 and two sides 20 and 22, respectively. Attached to each side of the compartment are at least two, and in this case three, "thrusters" 24, preferably ducted fan units. These fan units may, for example, be the type employed by Moeller International Corp. in the aforementioned Skycar. Other ducted fan units are disclosed in the aforementioned U.S. Pat. No. 6,179,247.

Because of the redundancy of thrusters, the loss of power in one thruster on each side would not result in a catastrophic failure of lift. By increasing the thrust of the remaining thrusters on the side where the failure occurred, the craft will remain under control and can be lowered safely to the ground.

Figure 2:
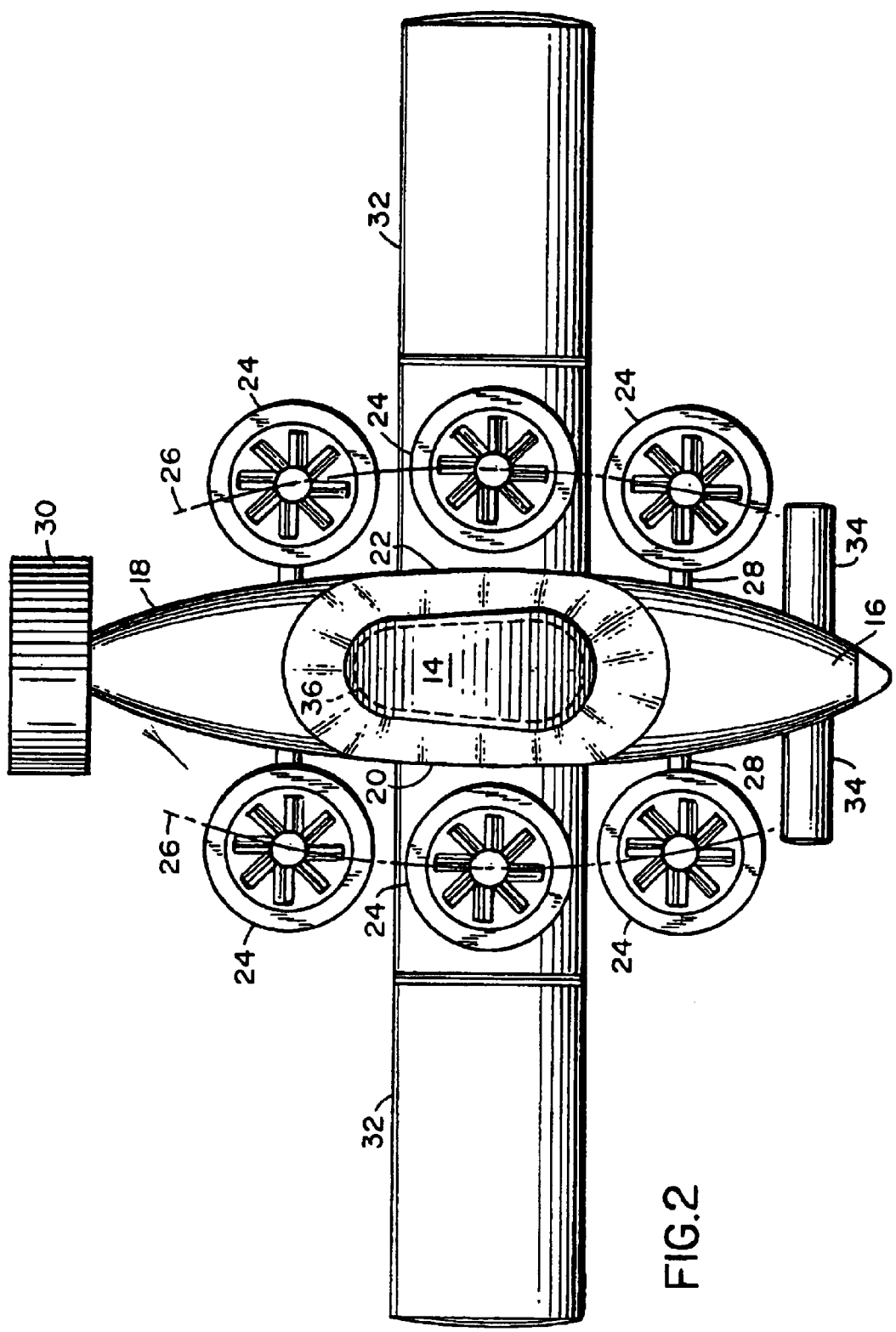
FIG. 2 is a top view of the PAC of FIG. 1.
Figure 3:
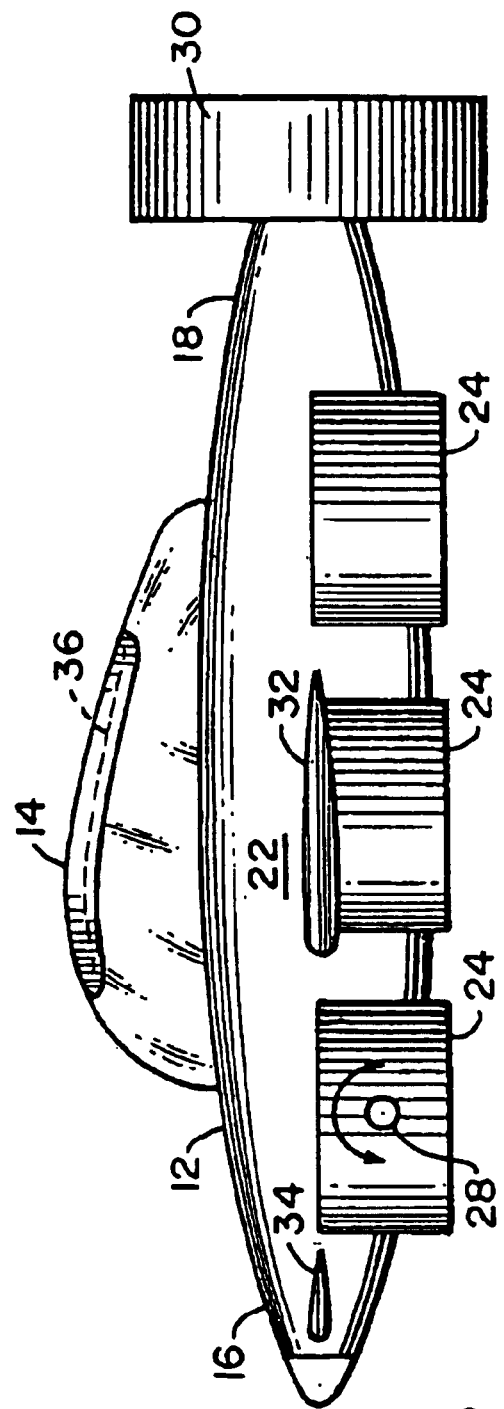
FIG. 3 is a side view of the PAC of FIG. 1.

As shown in FIG. 2, the central, rotational axes of the thrusters 24 are arranged along a curved line 26 which follows the outward curve of the fuselage. Alternatively, the axes of the thrusters may be arranged along a straight line, so that the thrusters lie one behind the other in the direction of travel thus minimizing drag.

Preferably, the amount of thrust generated by each of the thrusters is independently controllable by the pilot, or by a computer, in the passenger compartment. This allows the pilot, or computer, to adjust the thrust of the remaining thrusters in case of a failure of one or more thrusters.

According to a preferred feature of the invention, the forward thrusters 24 (or rearward thrusters, or all the thrusters) are arranged on a pivot 28 and can be tilted or rotated about the pivot to adjust the direction of force which these thrusters apply to the passenger compartment. Rotating the forward thrusters counterclockwise from the vertical position increases the forward force applied to the compartment; rotating them counterclockwise from the vertical position increases the reverse force applied to the compartment.

Preferably also, the PAC is provided with an additional fan 30, either ducted or non-ducted, arranged at either the front, the rear or both the front and rear of the passenger compartment, to exert a force in the horizontal direction. In flight, this thruster 30 provides the principal lateral motivating force to the craft.

When the PAC is moving in the forward direction, it is possible to take advantage of its motion through the air to add lift to the vertical forces generated by the thrusters 24. This lift is affected by a pair of conventional wings 32 extending from each side of the passenger compartment 12. As may be seen in FIGS. 1 and 2, the wings 32 preferably surround the center thrusters 24 and are open at the top to allow air to enter these thrusters.

Figure 4:
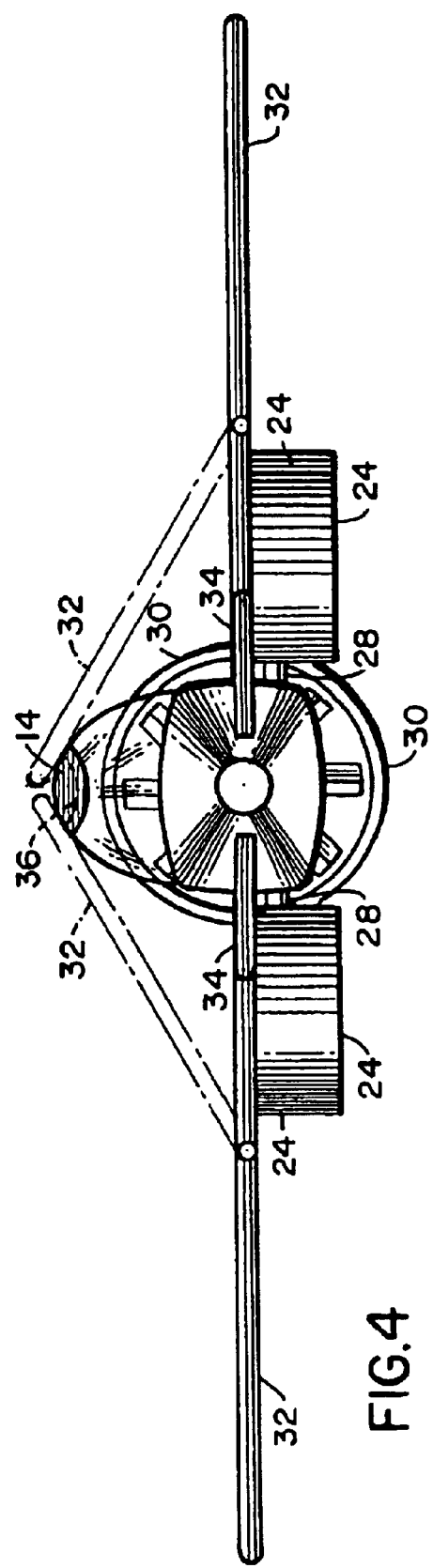
FIG. 4 is a front view of the PAC of FIG. 1.
Figure 5:
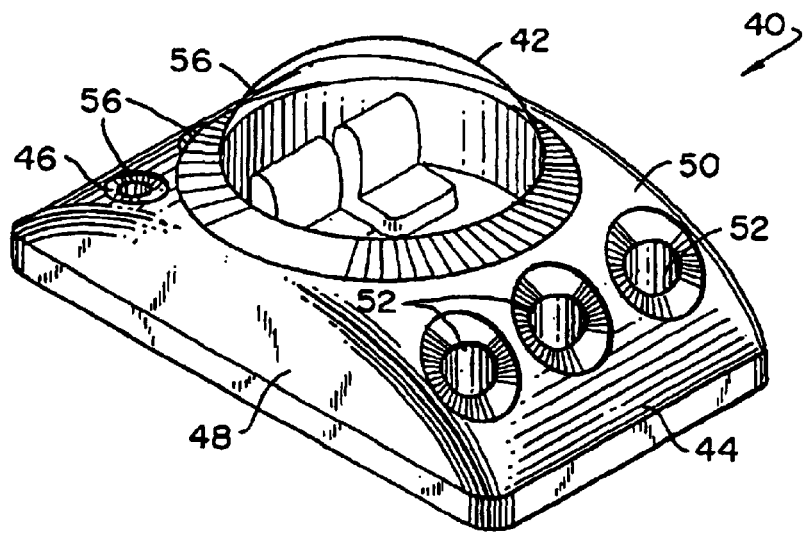
FIG. 5 is a perspective view of a second preferred embodiment of a PAC according to the present invention which incorporates a lifting body.

In order to save space when the PAC is stored or garaged on the ground, the wings 32 may be folded upward toward the passenger compartment, as is best illustrated in FIG. 4.

In addition, for control purposes, a stabilizing wing or canard 34 may be provided at the front of the fuselage. Alternatively or in addition, a rear stabilizer, and also a rudder, may be provided at the rear of the passenger compartment.

To provide an extra measure of safety, the PAC also preferably includes a parachute unit 36 disposed at the top 14 of the passenger compartment. This parachute unit 36 is arranged in line with the center of gravity of the craft. At the press of a button within the passenger compartment, means, such as a solid fuel rocket, are ignited to lift the parachute out of its compartment for deployment in the air.

In the second embodiment of the invention, shown in FIGS. 5–8, the personal aircraft (PAC) 40 comprises a passenger compartment or fuselage 42 in the shape of a "lifting body" having a front side 44, rear side 46 and two lateral sides 48 and 50. Built into the front side 44 are three thrusters 52 in the form of ducted fan units. Also, built into the rear side 46 are three thrusters 54, also in the form of ducted fan units. These thrusters are independently powered, for reasons of redundancy, and are capable of providing vertical lift. These thrusters also provide lateral thrust to the aircraft when the craft is tilted, either forward or backward, or when the thrust is deflected laterally by one or more deflectors (not shown).

Figure 6:
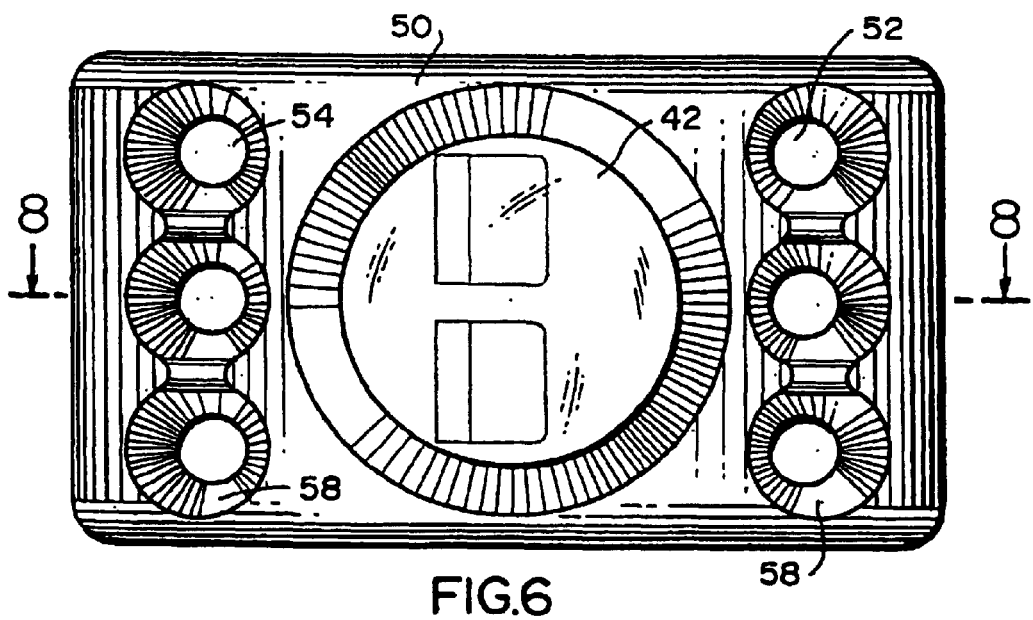
FIG. 6 is a top view of the PAC of FIG. 5.
Figure 7:
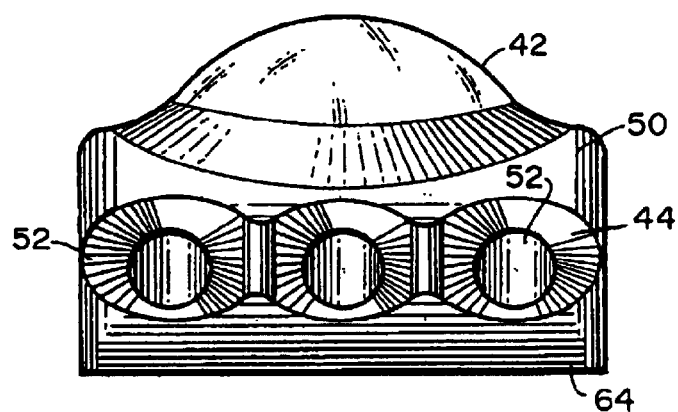
FIG. 7 is a front view of the PAC of FIG. 5.
Figure 8:
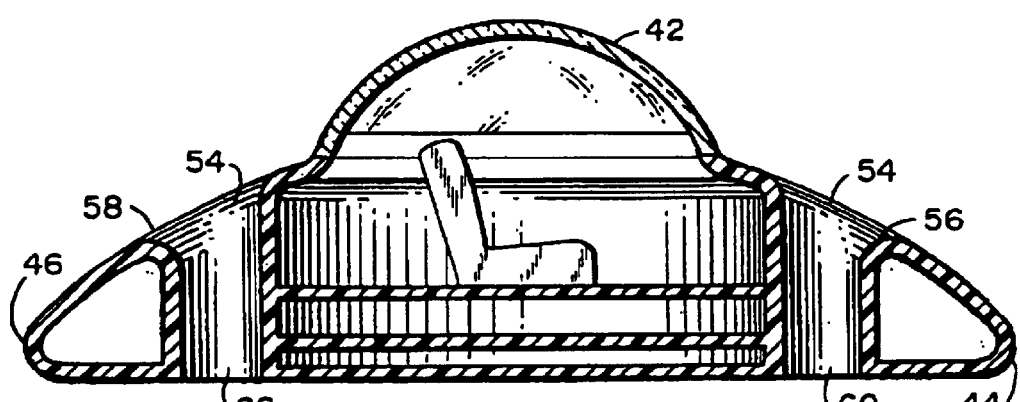
FIG. 8 is a cross-sectional view of the PAC of FIG. 5.

As shown in FIG. 6 in top view and in FIG. 8 in cross sectional view, the ducted fan units 52 and 54 comprise a tapered opening 56 and 58, respectively, and a circular tube 60 and 62, respectively, in which the air is accelerated by one or more impellers driven by one or more prime movers (not shown).

Advantageously, the outlets of one or more of these ducted fans may be provided with air deflectors (not shown) in a manner known in the art to deflect the exhaust stream of air in any desired direction. Such deflectors may be used for attitude control as well as to cause the aircraft to be propelled horizontally in any desired direction.

Alternatively, or in addition, the amount of thrust delivered by each thruster is independently controlled so that the altitude, attitude and horizontal motion of the aircraft is controllable entirely, or at least partially, by controlling the thrust of the individual thrusters.

According to a particular feature of the invention, a deployable airbag 64 is installed on the bottom of the passenger compartment to cushion the fall in case of a loss of power and thrust (lift) at low altitudes. The airbag may be deployed, for example, upon sensing a loss of thrust in one or more of the thrusters 52 and 54.

As will be understood from the configuration of the thrusters in the two PAC embodiments of FIGS. 1–4 and FIGS. 5–8, the loss of thrust in one of the thrusters on one side of the aircraft (either a front side, a rear side or on lateral side) will not result in a catastrophic fall of the craft. Rather, the output of the remaining thrusters on that side can be increased to compensate for the loss of power in one of the thrusters, at least until the craft can be brought down to a safe landing.

Figure 9:
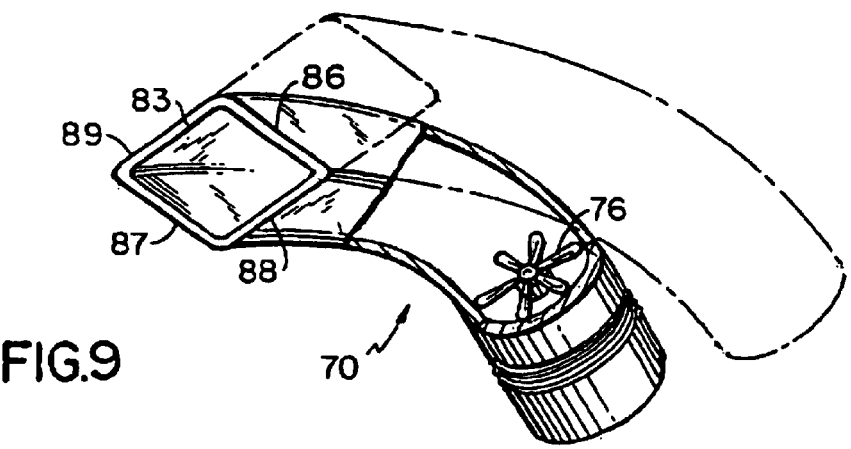
FIG. 9 is a perspective view of one preferred embodiment of a ducted fan unit according to the present invention.
Figure 10:
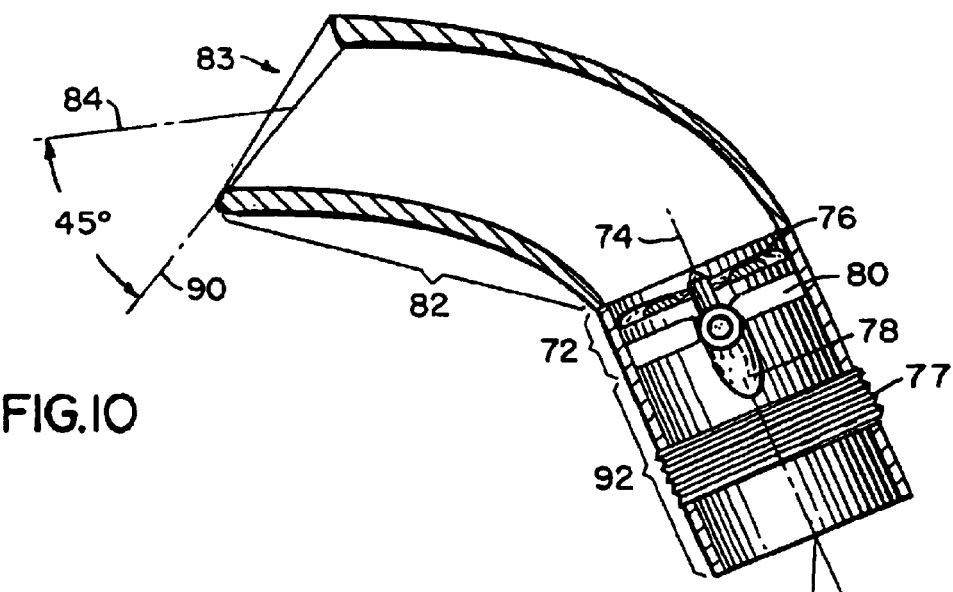
FIG. 10 is a cross sectional view of the ducted fan unit of FIG. 9.
Figure 11:
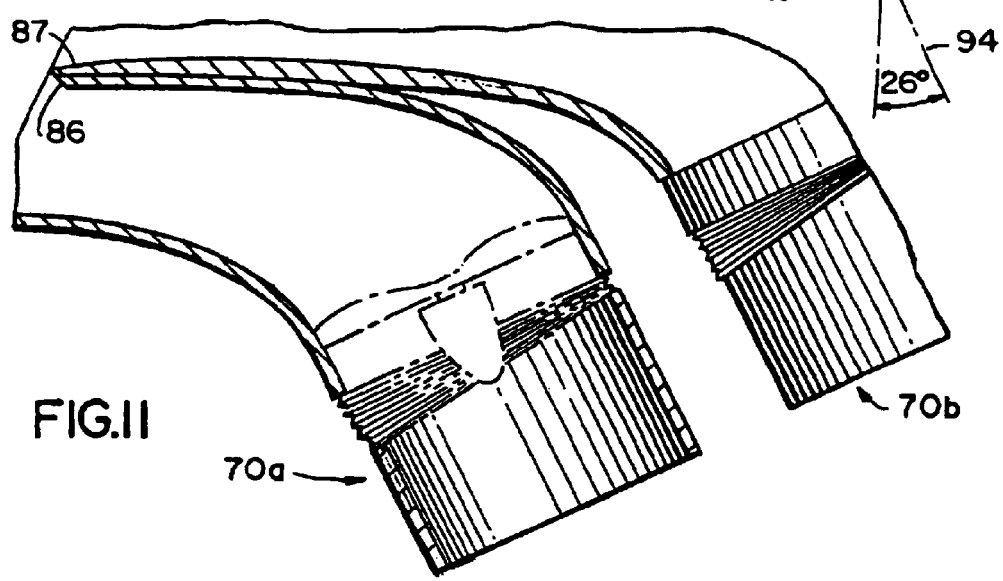
FIG. 11 is a detailed, cross sectional view of two ducted fan units of the type shown in FIG. 9.

In the first two embodiments of the PAC shown in FIGS. 1–4 and FIGS. 5–8, any conventional ducted fan unit may be used as a thruster. FIGS. 9–11 illustrate the preferred embodiment of a particular ducted fan unit according to the present invention.

Preferred Embodiment of Ducted Fan Unit (Levitator): As shown in perspective view in FIG. 9, and in cross-sectional view of FIG. 10, the ducted fan unit 70 comprises a first cylindrical tube portion 72 having a first central axis 74 disposed at an angle to the vertical. The first tube surrounds an impeller 76 which is driven by an internal combustion engine 78 mounted on stater blades 80 that "straighten" the flow of air forced downward by the impeller blades 76.

A second tube portion 82, having a substantially rectangular inlet and a circular outlet, is mounted ahead of the tube 72 relative to the direction of flow of the air. The outlet of the second tube 82 is cylindrical and has the same internal diameter as that of the first tube, the outlet of the second tube extending coaxially with and smoothly into the inlet of the first tube. The inlet 83 of the second tube, on the other hand, faces forward in the direction of travel and has a substantially horizontal, second central axis 84.

The inlet 83 of the second tube 82 is substantially rectangular in shape having upper and lower substantially horizontal edges 86 and 87, respectively, and two side edges 88 and 89. The upper edge of the opening in the inlet of the second tube and/or the lower edge of this opening has an aerodynamic contour which produces lift due to airflow into the inlet 83.

The edges 86–89 of the inlet 83 define a substantially planar face 90 of the inlet which forms an acute angle with respect to the second central axis 84. This acute angle is between 0 and 90°, preferably in the range of 35 to 55°, and more preferably in the center of this range; i.e., at 45°.

The ducted fan unit 70 also has a third tube portion 92 with an inlet and an outlet 93. The inlet of this third tube is cylindrical and has the same internal diameter as that of the first tube 72, the outlet of the first tube extending coaxially with, and smoothly into, the inlet of the third tube. The outlet 93 of the third tube is also preferably circular in cross-section and has a third central axis 94. A flexible portion, such as a bellows 86, or an articulated portion, is arranged between the inlet and the outlet of the tube 92 to allow for the adjustment of orientation of its third central axis 94 and, thus, its outlet 93.

As will be explained herein below, a hydraulic, pneumatic or other mechanical device is provided to adjust the orientation of the outlet 93 of the third tube.

Advantageously, the first tube 72 is made somewhat longer and a second impeller is disposed therein to rotate about the first central axis 74 in a direction opposite to the direction of rotation of the first impeller. This second impeller not only serves to increase the outflow speed of air at the outlet of the first tube but it also compensates the radial component of the airflow imparted by the first impeller 76. The second impeller may be driven by the engine 78 or by a second engine mounted either inside or outside the tube 72.

Similar engines for this application are well known and used in large model airplanes, small motorcycles and the like. Engines of this type are disclosed in the above-referenced U.S. Pat. No. 6,179,247.

Advantageously, where internal combustion engines 78 are used to drive the impeller(s), the air intake ports of such engine(s) are disposed outside of the first tube. This arrangement increases the density of air aspirated by the engine(s).

As shown in FIG. 10, the first central axis 74 of the first tube 72 and (when the third axis is in alignment therewith) the third axis 94 of the tube 92 are disposed at angle to the vertical. This angle is preferably in the range of 0 to 90°, preferably 15 to 35° and, specifically preferably approximately 26°.

As is shown in phantom view in FIG. 9 and in cross-sectional view in FIG. 11, the ducted fan unit 70 may be "siamesed" with a second, similar or identical unit.

As mentioned above, the horizontal edges 86 and 87 of the inlet 83 are contoured to provide "lift" due to the flow of air. Although the precise curvature may be experimentally determined, suffice it to say that the inlet edge surfaces may be shaped in the manner of an aircraft wing airfoil to take advantage of Bernoulli's Principle and the Coanda Effect.

FIG. 11 illustrates how the upper edge 86 of one ducted fan unit 70a may be paired with the lower edge 87 of a second, siamesed ducted fan unit 70b.

If the side edges 88 and 89 of the ducted fan unit are substantially linear and vertical, the units may be paired side-by-side as well as one above the other.

Figure 12:
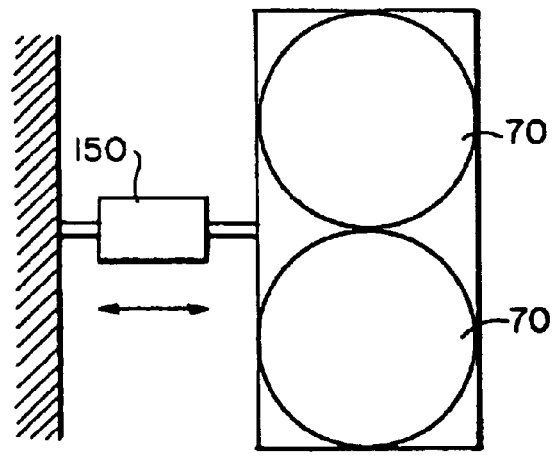
FIG. 12 is a representational diagram of a device for adjusting the orientation in one dimension of the outlet tubes of two siamesed ducted fan units of the type shown in FIGS. 9–11.
Figure 13:
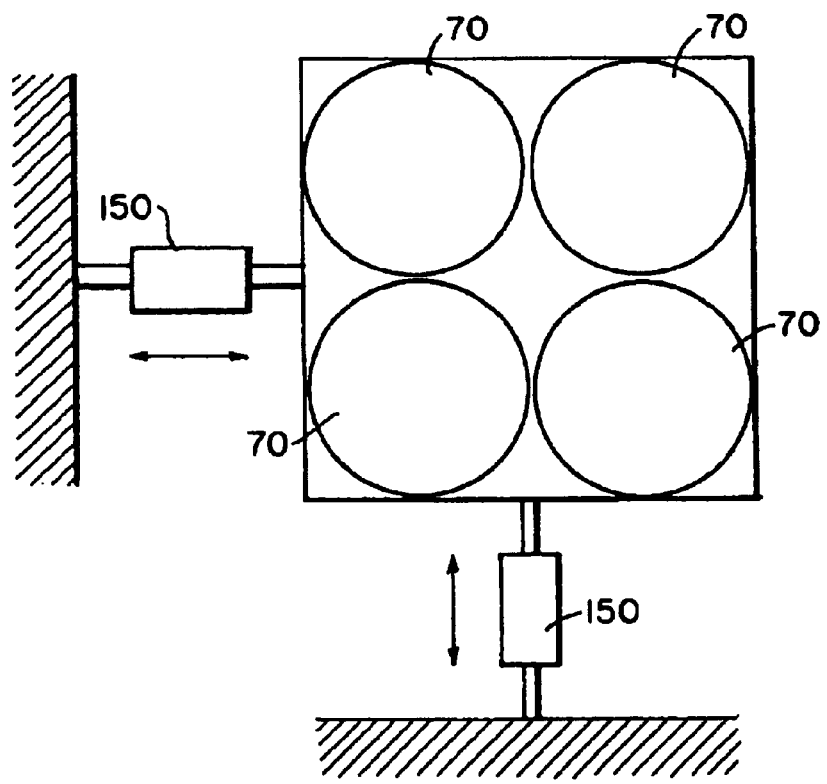
FIG. 13 is a representational diagram of a device for adjusting the orientation in two dimensions of the outlet tubes of four siamesed ducted fan units of the type shown in FIGS. 9–11.

FIG. 12 illustrates a device for adjusting this orientation in one dimension. FIG. 13 shows a device for adjusting this orientation in two dimensions. In FIG. 12, the outlets of two siamesed ducted fan units are moved together; in FIG. 13, the outlets of four siamesed ducted fan units are moved together.

In FIGS. 12 and 13, the devices 150 for moving the outlets of the ducted fan units may be pneumatic, hydraulic or electrically operated. For example, suitable servos may be used to move the outlets of the ducted fan units into any desired configuration.

Set forth below is a detailed discussion of various aspects of the ducted fan unit (levitator) of FIGS. 9–11, some of which have been described above.

Rectangular Inlet: The ducted fan unit is designed specifically to meet the operational requirements of the PAC. These include (but are not limited to): forward cruising flight at approximately 50 mph with a top speed of 100 MPH; the ability to take off and land vertically; precision controllability at zero or low flight speeds; and efficient, lightweight propulsion in all flight regimes.

It is assumed that most PAC flight time will occur in point-to-point travel; i.e. generally forward flight. But it is also assumed that the PAC will utilize the capability of hovering for periods of fifteen minutes or more.

For maximum safety the PAC incorporates multiple and redundant ducted fans units. It is vital that all of these D-F units operate, in every flight regime, with minimal interference. More specifically, no fan unit should block or reduce the intake airflow volume or density of any other unit when hovering. When a forward speed is attained which provides sufficient lift to support the craft, some interference may be permitted although such interference should be minimized.

The provision of the rectangular inlet is based on this major consideration. Since multiple ducted fan units are used in the PAC, rectangular-shaped intakes permit efficient "stacking" of these units, both mechanically and aerodynamically. FIG. 6 depicts a vertically-joined pair of D-F units. Another vertically joined pair can be arranged horizontally alongside, if desired.

In addition, there is an aerodynamic advantage to a rectangular air inlet over a circular one. In particular, as is discussed below, the inlet may be shaped to provide extra lift to the craft.

Slanted Inlet Face: The inlet face is set at an angle to the perpendicular to the inlet air path centerline to improve airflow during hovering. If the inlet faces of all the D-F units were vertical, in hovering flight the uppermost intakes could "steal" air from the lower ones. Slanting the inlet face permits vertical joining or "siamesing" two D-F units with minimal flow interference to incoming air to the two inlet openings.

A 45 degree angle with respect to the vertical appears geometrically optimal for the inlet face slant, because it presents the same "normal face area" in both vertical plan view and horizontal front view.

However, since the actual angle of the entering airstream will be strongly influenced by its entering velocity, a smaller inlet face angle (closer to vertical) may prove to be more efficient in a "siamesed" D-F unit configuration. The optimum angle can be easily determined by experiment.

The Inlet Passage: The inlet passageway of the D-F unit should be designed to provide maximum flow volume, as required by the PAC application. Ideally, the maximum airstream velocity increase should occur only at the impeller because the D-F unit is a reactive device. For maximum thrust, it needs to accelerate as much air mass as possible—and this requires maximal air density at the impeller face.

For highest efficiency, the D-F units must minimize all obstructions to the through airflow. Anything that reduces the flow volume reduces thrust. A poorly designed inlet may even produce a negative feedback effect at the impeller, causing it to over-speed as its flow output drops.

The Outlet Passage: The outlet of the D-F unit should be designed to maximize the static thrust. Experiments have shown that flaring the outlet can slightly increase the static thrust; however, such flaring is not necessary and it may impair the ability to control the craft by deflecting the outlet flow.

Nominal angle of the Outlet Passage: Aeronautical engineers have several convenient "rules of thumb" that they find useful in the initial design stages of an aircraft. One of these involves the "lift-to-drag" (L/D) ratio of the aircraft. This is the relationship between how much lift can be generated by a wing, a rotor, a lifting body (or whatever) and how much power is required to move the aircraft in flight at the desired speed.

For example, a Cessna 172 aircraft in "clean trim" has an L/D ratio of about 7.9. Among other things, this means that with a gross weight of 2400 pounds, slightly more than 300 pounds of thrust are needed for level flight.

As a first approximation a flying PAC may be designed to have an L/D of 2 in "cruising flight". In other words, while the craft would need enough vertical lifting capability (vertical thrust) from its D-F units to support its gross weight (approximately 2000 pounds including a full complement of fuel) when hovering, it would require a forward thrust equal to only about half this vertical lifting capability to sustain forward flight.

The outlet passage of the D-F unit is set at 26 degrees to meet the "L/D=2" criterion for both hovering and forward flight. Using the well-known "triangulation of forces" principle and trigonometric tables (or a scientific calculator) it may be shown that a 26 degree inclination produces almost exactly a 2:1 ratio between vertical and horizontal components.

To eliminate forward thrust while hovering, the inclination of the outlet passage is made adjustable, so as to direct the air vertically downward during the hovering mode.

Shape of Inlet Passage: The "single surface airfoil" shape of the inlet passage is an aerodynamic shape which results in optimal airflow over and across the leading edge of an aircraft wing and provides an extremely high lift to drag ratio.

The airfoil shape of the leading edge is not a true circle with a radius. It has a circular radius at its very front (less than 2% of the total chord)—but, aft of that, the adjacent curvature is substantially parabolic.

This cross-sectional configuration (airfoil) of the interior surfaces of at least the top and bottom sides (if not also the vertical sides) of the rectangular intake opening is an important feature of the present invention. The flow of air passing near the intake edges will not be axial. The direction of airflow is caused to change, with as little turbulence generation as possible, so as to minimize the inlet stalling tendencies while increasing the air density within the inlet.

The top and bottom surfaces of inlet passage of the D-F unit are also configured to generate additional lift for the PAC. Such a lifting passage was used on an aircraft called the Custer Channel Wing developed in the immediate post-WW2 years. It featured two semi-circular "wings" and two engine-driven propellers pointing forward within the wings, having the same radius as the wing's curvature. The wings and propellers thus formed two semi-ducted fans.

The Channel Wing flew extremely well. At least two flying prototypes were built. Lift was developed at low forward speed by the aerodynamic effects of the propeller slipstream passing over the semi-cylindrical wings.

This craft had a fatal weakness, however: it could not fly with one engine out. Nor did it have any gliding capability: the Channel Wing needed engine power to stay aloft.

The "top" and "bottom" interior contours of the D-F inlet duct are designed to produce appreciable dynamic lift from the air passing over them in the same way as the Custer Channel Wing. But in this application, efficiency is substantially greater because:

(1) The air flows over two lift-generating surfaces rather than one; and (2) The airflow passing over the top and bottom inlet duct contour is linear, rather than the spiraling slipstream behind the Channel Wing's propellers.

Levitator Construction: The drawings which illustrate the configuration and features of the levitator are not to scale. In actuality the proportions of the most efficient fan unit configuration may be much "flatter" in overall height. The "tailpipe" length aft of the flexing section is preferably at least equal to its diameter, in order to provide efficient directional flow control when the outlet section is deflected. The optimum useful length can easily be established by experiment.

The ductwork for the ducted fan can be constructed of lightweight, easy-to-fabricate materials: fiberglass composites, thermo-plastics, aluminum, even laminated wood. Advantageously, a sandwich construction may also be used with a foam or honeycomb core.

Ducted Fan Operation (in General): An "energy efficient" ducted fan unit needs to maximize mass flow, and minimize the difference between vehicle speed and slipstream velocity.

One way to view a ducted fan is as a means for creating a pressure differential, especially since pressure is quite convenient to measure. However, this is actually irrelevant to the way a ducted fan provides thrust. Thrust is generated by propelling a mass of air in one direction; and the physical reaction to that movement of air results in thrust in the opposite direction.

An increase in either the mass or the velocity of the air, or both, increases the reaction effect (static thrust) of the D-F unit, though not to the same degree. If the mass is doubled, the power requirement doubles and the reaction doubles. However, doubling the air velocity requires approximately 2.8 times the power.

The simplest way to increase air mass driven by the impeller of a D-F unit is to increase the diameter of the duct. Similarly, the simplest way to increase the velocity of airflow in a D-F unit is to increase in the power applied to the impeller. However, as the power applied to the impeller is increased, the efficiency of the D-F unit is decreased.

Power to Weight Ratio: The fundamental goal in the design of a PAC is to minimize the gross weight: that is, the weight which includes the fuel as well as the tanks needed to hold that fuel. Every extra pound of mass in the PAC requires extra lifting power to sustain it in flight—and such extra power requires an extra expenditure of energy (fuel).

This is a good example of a vicious circle. An increase in power requires a stronger engine and higher fuel consumption. To achieve this, the aircraft structure must be made stronger to support the extra engine weight and torque and the extra weight of the fuel. This increases the weight of the craft and requires increased power.

Consequently, the airframe and ducted fan units of the PAC must be made simple and as lightweight as possible. For the D-F units, engines must be selected which are highly energy (fuel) efficient and which have a high horsepower to weight ratio—in the order of 1 to 2 horsepower per pound. With such engines, which are commercially available for example from the sources indicated above, only about one third of the gross weight of the craft would be required for both the engines and fuel. Thus for a craft having a gross take-off weight of 1500 pounds, it is projected that the engines and fuel would weigh no more than 500 pounds, leaving five hundred pounds for the craft structure and 500 pounds as a payload.

In the third embodiment of the invention shown in FIGS. 12 and 13, the personal aircraft (PAC) 100 comprises a passenger compartment or fuselage 102 which supports a rather conventional wing 104. A tail section of the craft includes a rudder 106 and a horizontal stabilizer 108 with control surfaces 110. The tail also incorporates a ducted fan unit 112, similar to that in the first embodiment of FIGS. 1–4, to provide forward thrust to the aircraft.

Vertical thrust as well as some horizontal thrust is also provided by four sets of ducted fan units 114 and 116, both forward of the wing 104, and 118 and 120, both aft of the wing 104. These sets of ducted fan units are attached to the fuselage, preferably in spaced apart relation by suitable fairings 122.

FIGS. 14 through 18 illustrate a third embodiment 130 of the personal aircraft (PAC) according to the invention. This embodiment is in the form of a "flying wing", although the fuselage may be provided with a canard, as desired, to increase stability.

Figure 14:
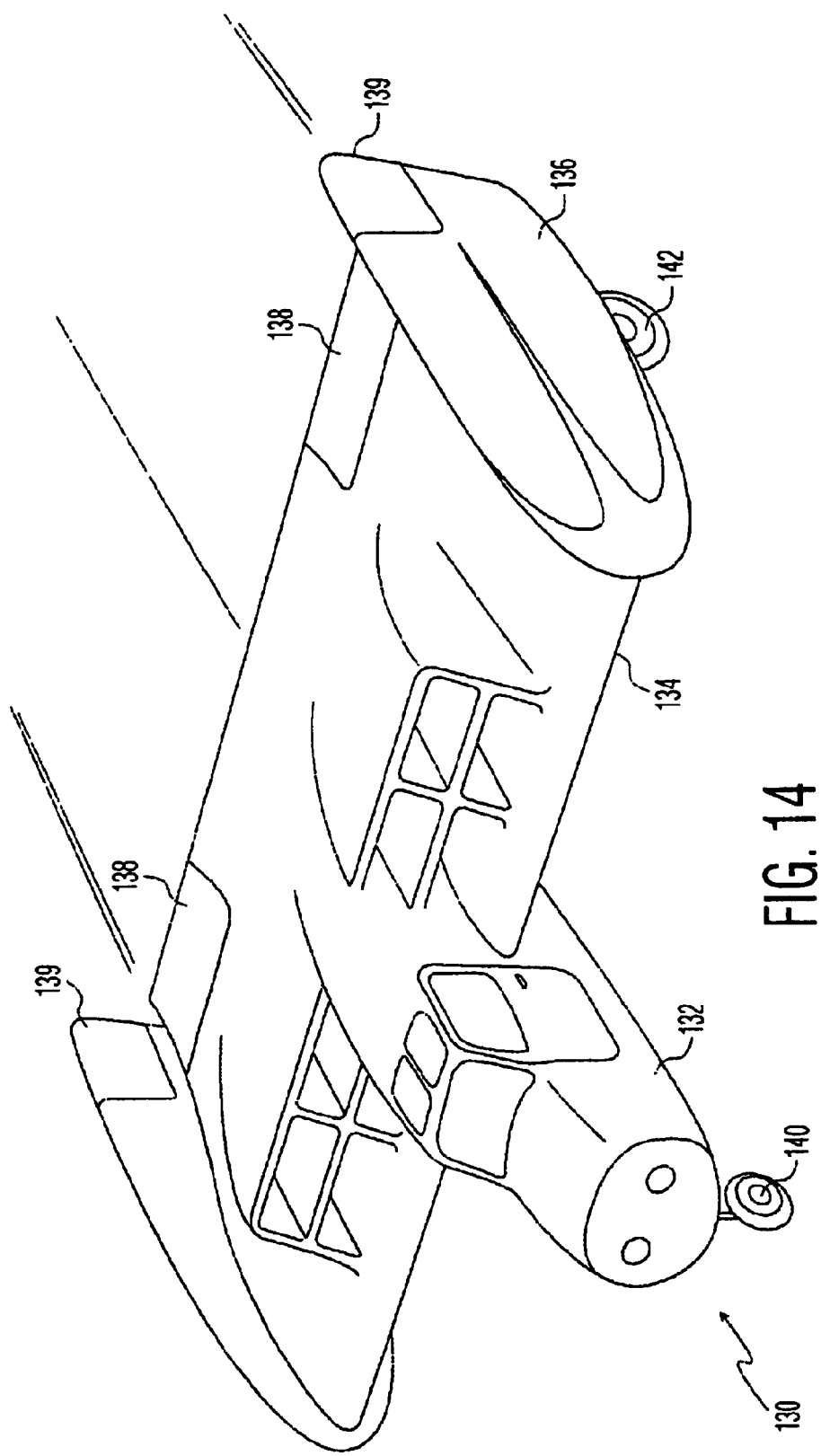
FIG. 14 is a perspective view of a third preferred embodiment of a PAC according to the invention, which incorporates eight ducted fan units of the type shown in FIGS. 9–11.
Figure 15:
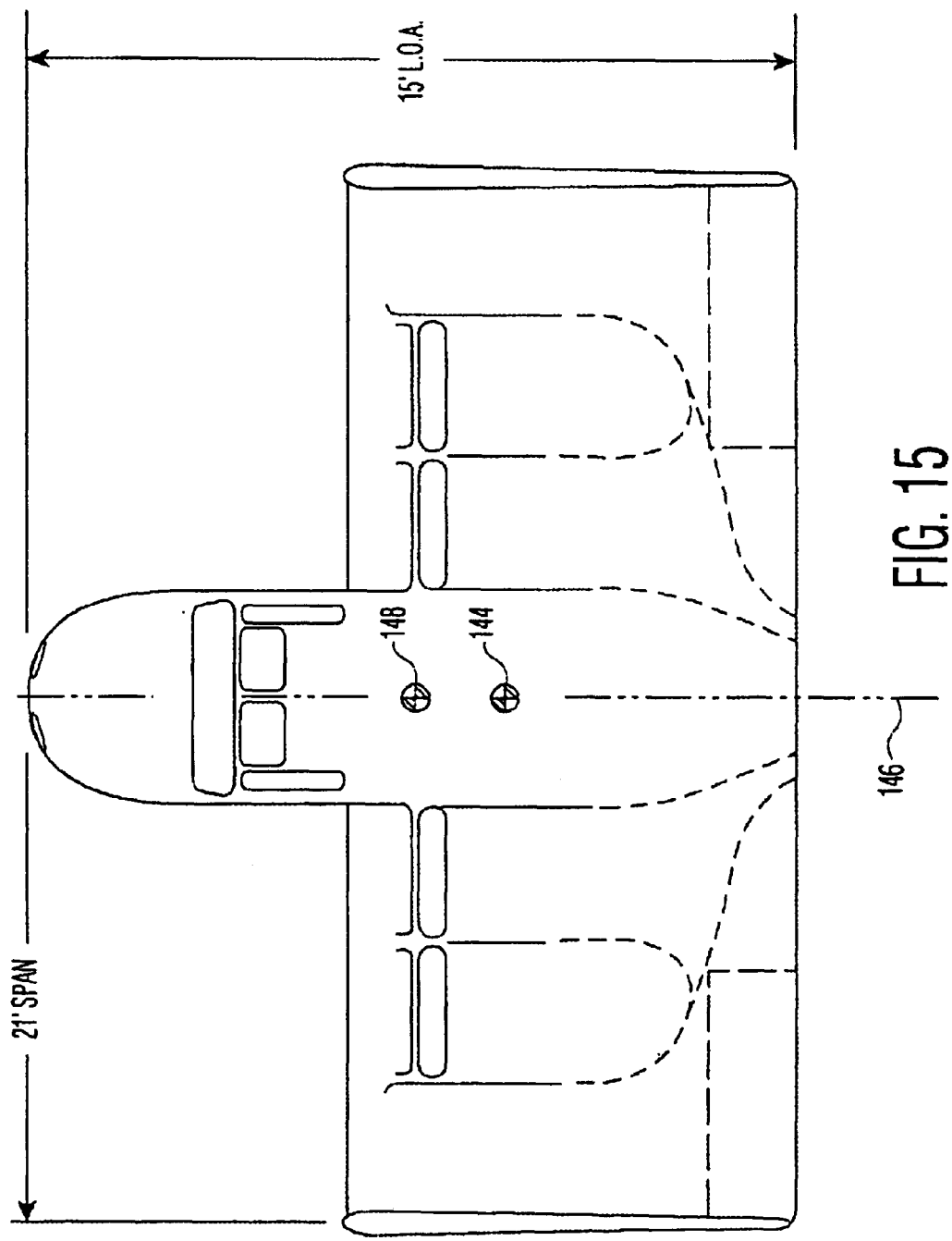
FIG. 15 is a top view of the PAC of FIG. 14.
Figure 16:
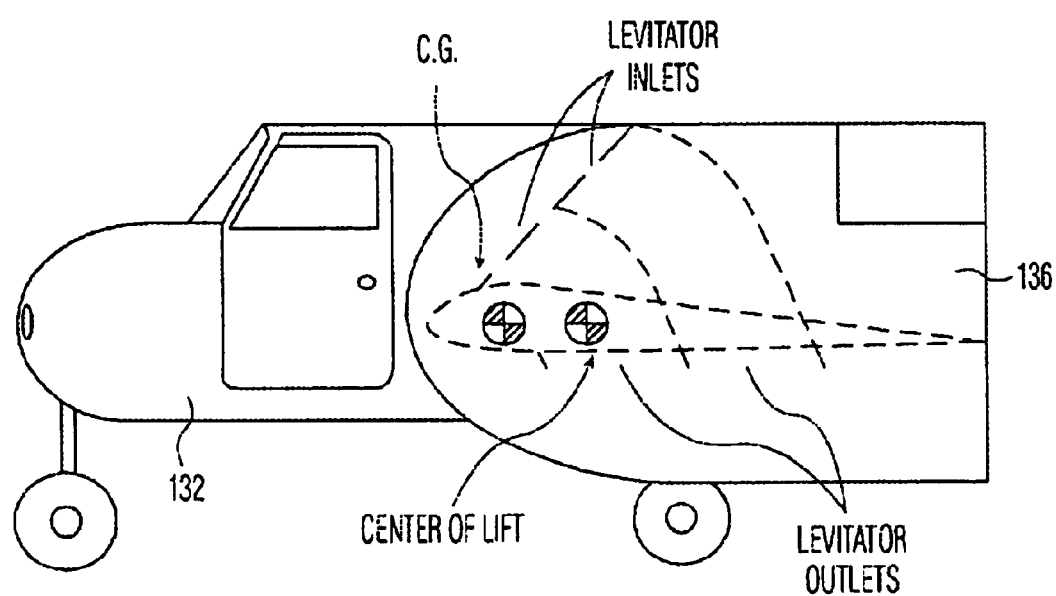
FIG. 16 is a side view of the PAC of FIG. 14.
Figure 17:
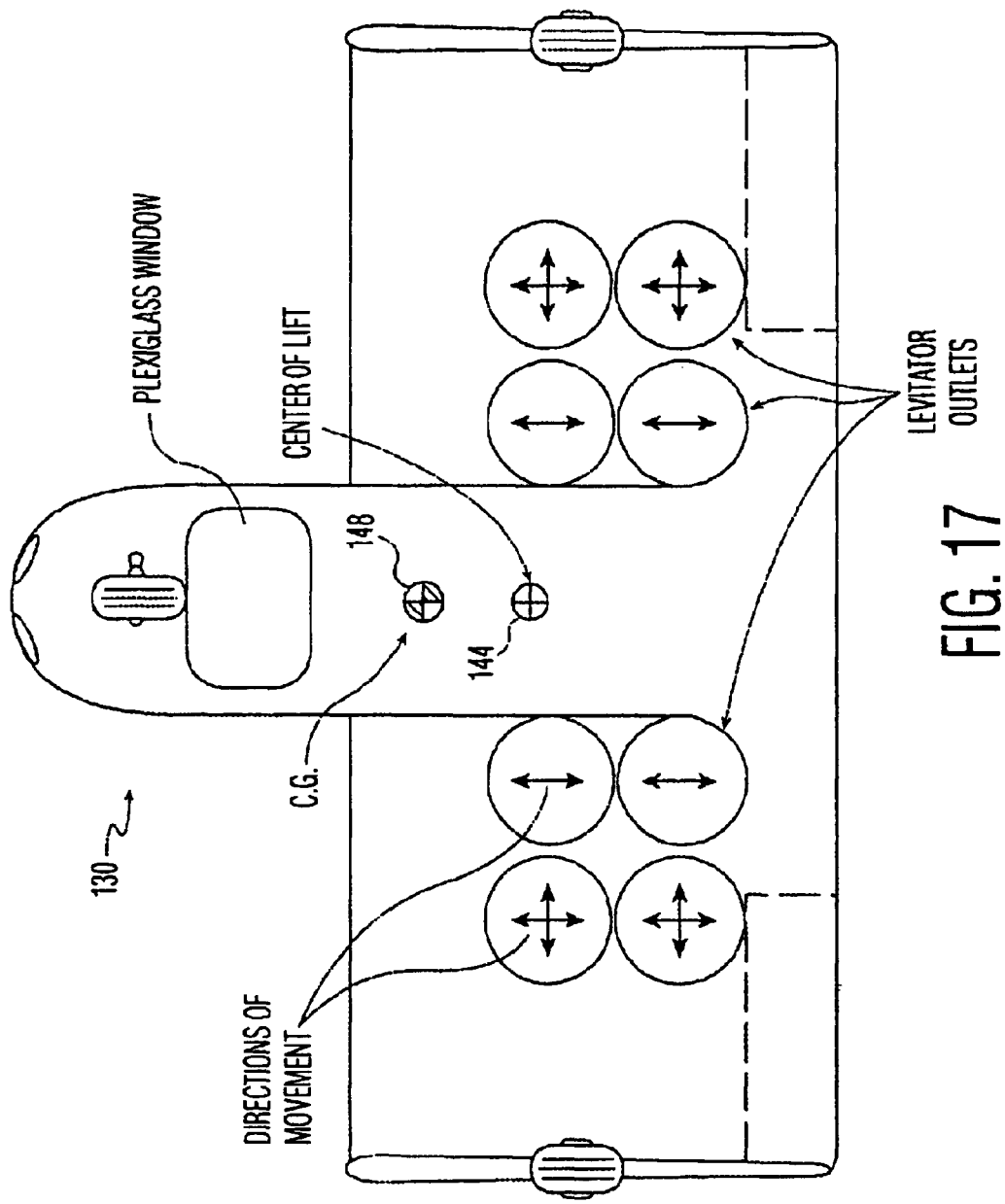
FIG. 17 is a bottom view of the PAC of FIG. 14.
Figure 18:
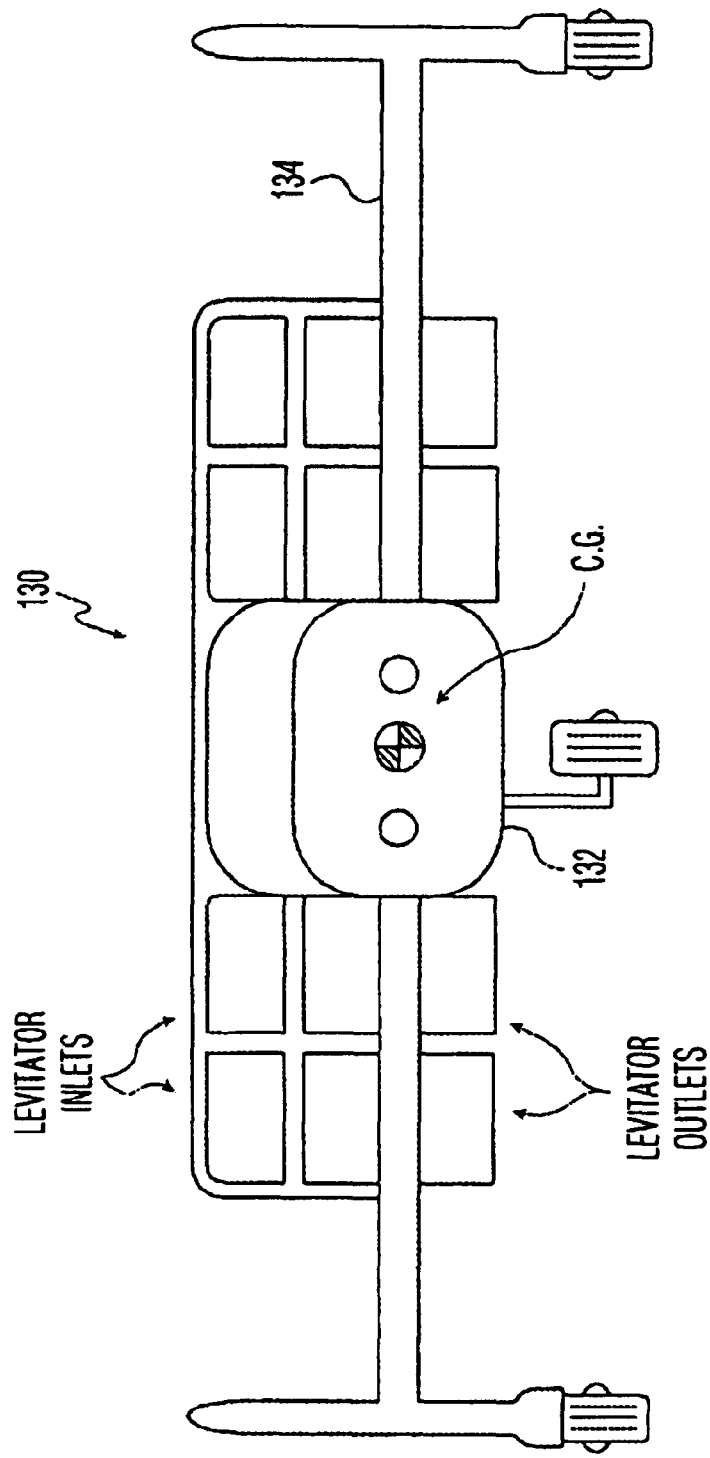
FIG. 18 is a front view of the PAC of FIG. 14.

As is shown in FIGS. 14 and 15, the PAC 130 comprises a fuselage 132 and a wing 134 with vertical stabilizer surfaces 136 at each end ("tip bins"). Control surfaces 138 and 139 are provided on the trailing edges of the wing 134 and the vertical stabilizers 136, respectively.

As an example, the fuselage, which extends forward from the wing, may have a total length of 15 feet, from its nose to the trailing edge of the wing, and the wing may have span of 21 feet. The total weight of the craft (without fuel or payloads) may be approximately 1200 pounds.

A nose wheel 140 and a wheel 142 at the end of each wing are provided, not for takeoff and landing (since this craft is designed for VTOL operation) but for convenience in moving the craft about on the ground.

Built into the wing 134 on either side of the fuselage 132 are eight ducted fan units of the type described above in connection with FIGS. 9–11. These ducted fan units function to lift the craft vertically and to provide forward thrust, as desired. The nominal center of lift 144 of the craft is located along the center line 146 somewhat aft of the nominal center of gravity location 148.

Stability and control of the aircraft are provided by varying the engine speeds of the ducted fan units and by adjusting the orientation of the axis 94 of the outlets of the fan units. Additional aerodynamic control surfaces may be added, as desired.

The configuration of the PAC shown in FIGS. 14 and 15 is an approximation. The aft contours of the passenger "pod" and ducted fan units are smoothly faired, with a minimum of re-entrant curvature.

Advantageously, fairings are provided ahead of the ducted fan exits on the underside of the craft. Fuel tanks are preferably located within the ducted fan unit fairings, as close to the center of gravity 148 as practicable.

The airfoil used in this PAC embodiment is preferably a "reflexed" type, chosen for its longitudinal stability in forward flight, particularly at cruising speed.

Directional stability may be enhanced by a small amount of angular "toe-in" on the tip fins 136. Additional vertical fin area may be desirable because of the fins' longitudinal closeness to the craft's center of gravity.

The upwardly directed force (lift) on the aircraft comes from three services:

(1) The ducted fan units generate lift by the positive displacement of air through their rotating impellers.

(2) The top and bottom inner surfaces of the ducted fan units' inlet ducts are shaped so as to act as airfoils, providing lift from the dynamic reaction of the air drawn over them as it passes into the impellers.

(3) During forward flight, the wing area outboard of the ducted fan units act as a conventional aircraft wing.

The four lower (forward) ducted fan units in the PAC include, as the front portion of their lower inlet passage surfaces, the same airfoil as the wing. The four inner ducted fan units include as their inboard inlet passage surfaces, the same surface contour as the passenger pod.

The objective of the aircraft design according to the invention is to provide an optimized configuration for a two-seater Personal Aircraft (PAC), capable of Vertical Takeoff and Landing (VTOL), hovering, and forward flight at cruising speeds in the range o 50 to 100 mph. This aircraft is intended to be stable in all flight modes, easily controllable, durable, and as safe as possible for its passengers. Learning to operate it should be at least as easy as learning to drive a sports car, and maintaining it should be no more difficult than the routine maintenance for an inboard-powered motorboat.

The basis of this unique PAC design involves two independent distinct (but interrelated) innovations: the power units (e.g., the levitators) and the airframe configuration.

Levitator Control: The outlet duct of the levitator is subject to neither high internal pressure nor excessive temperature. Therefore a plastic bellows-type flexible section (wire-reinforced for extra safety) can be used as a means of adjusting and/or controlling the direction of the levitator outflow. The resultant forces from outflow deflection provide a convenient means of controlling the flight path, velocity, and attitude of an aircraft powered by these units.

The validity of this method of aircraft flight control—particularly at low or zero flight speeds—has been proven by such experimental aircraft as the British Hawker P-1127 (1961), which was the forerunner of today's "Harrier" jet fighters. The major problems encountered with gimbal-mounted jet engine orifices in jet aircraft of this type had to do with the very high temperatures and efflux velocities involved. The levitator suffers from neither of these adverse conditions.

In the nominal design configuration proposed for prototype testing, the levitator units are installed with their impeller centerlines tilted (e.g., approximately 26 degrees) from the vertical, with outlets to the rear. (This proposed orientation does not take into account the dynamic lift forces generated within the inlet ducts, and is subject to change as a result of routine experimentation.)

Because of the desirability of being able to bring the PAC vehicle to a quick stop in midair, the levitator outlet ducts will most likely need to be deflected through a greater forward angle from their nominal "in-flight" positions than they will be deflected rearwards in cruising flight. Therefore it may well be advantageous to install the flexible "bellows" sections in a "pre-loaded" condition (partly deflected aft in "normal position") to allow for this differential.

In the third preferred configuration for the PAC, as shown in FIGS. 14 through 18, multiple, in particular 4, levitator units are provided on each side of the craft. For a number of reasons it appears best to group these units together, close to the PAC's design center of gravity (CG):

1. Failure in flight of any individual levitator unit will produce minimal upsetting effect—and will require minimal compensation for that—if they are all grouped closely around the aircraft's design CG.

2. Control linkage problems will be minimized by this "grouped" arrangement of levitators. In this regard it is desirable that the levitator outlet ducts be connected in tandem pairs, such that they move together as control is applied by the pilot (or automatic pilot). In this way, if one levitator unit fails, compensation for that failure can normally be accomplished by increasing the power output of its mated unit.

3. Closely grouping the levitator units will decrease inertial effects, primarily those influencing lateral control. This may become an important safety consideration during hovering flight close to the ground (as in takeoffs and landings) where gusts and turbulence are probable and pose the greatest danger.

4. Power plant installation will be both simplified and lightened by this grouped arrangement.

PAC Airframe—Aerodynamic Considerations: The design elements of the PAC interact to a higher degree than in conventional aircraft design because of the several close inter-relationships of the power units, passenger-access provisions, stability requirements, aerodynamic efficiency, necessary light weight, durability, and safety. For example, a delta wing design would probably offer improved aerodynamic lift capability, a higher stalling angle, and a better strength-to-weight ratio than the configuration shown in FIGS. 14 and 15. However, using a delta wing makes passenger entry and exit much less convenient than the "car door" arrangement which a rectangular wing planform permits.

In view of the aforementioned inter-relationships, the configuration shown in FIGS. 14–18 offers acceptable compromises.

1. The rectangular, low-aspect-ratio wing has appreciable thickness—estimated at 20% to 25% of the chord. This has several structural benefits. Aerodynamically it permits a large leading edge radius, which in turn allows a wide range of attack angles in flight. This is intended to provide an essential element in low-speed maneuverability, permitting rapid changes in nose-up/nose-down attitude for collision avoidance and landing/taking off from limited-access areas.

2. The major aerodynamic drawbacks of a low-aspect ratio wing—tip losses and high drag—are minimized by the tip fins in the proposed design. These also serve as fairings for the wheels and can enhance directional stability (i.e.

reduce "snaking" in flight). Controllable rudders inset into the fin trailing edges provide a positive means of directional changes in forward flight modes.

3. The use of a reflexed airfoil should enhance longitudinal stability in what amounts to a "flying plank" design. This has proven successful in an unpowered, single-seater, aerobatic glider of comparable planform to this PAC configuration of FIGS. 14–18. On the other hand, because of the presently unknown aerodynamic effects of the grouped Levitator ducts and their fairings, it may be sufficient to merely install the elevons at a negative angle of incidence, and use a more conventional non-reflexed airfoil. Routine experimentation with models can easily resolve this issue.

An important consideration in this regard is that a reflexed airfoil has a low—possibly zero—center of pressure travel. This makes for a wider range of permissible flight CG positions, and minimizes necessary "trim" changes as the flight regime changes between hovering and forward flight. Advantageously, the addition of the top inlet ducts are optimized to insure the center of pressure position versus angle of attack.

PAC Airframe—Practical Considerations: Convenient passenger access and exit, excellent forward and side visibility (including a transparent area in the floor to assist in landings)—plus the possibility of being able to move the passenger seats fore and aft as may be required to insure a safe, in-flight CG location—all call for an automotive type of passenger accommodation.

The absolute necessity of correct in-flight CG location for the PAC mandates fail-safe methodology to prevent the PAC from ever being flown with an improper CG. The proposed "best method" of accomplishing this is with dual strain gauges at each wheel mount. The readouts from these gauges are fed to a computerized module which determines the actual PAC CG by comparing the strain gauge readings. If this CG determination is outside the permissible range, the engines cannot be started. Also, if any strain gauge gives a different reading from its twin, indicating possible failure and a potentially erroneous reading, the on-board computer module again prevents engine startup.

Figure 19:
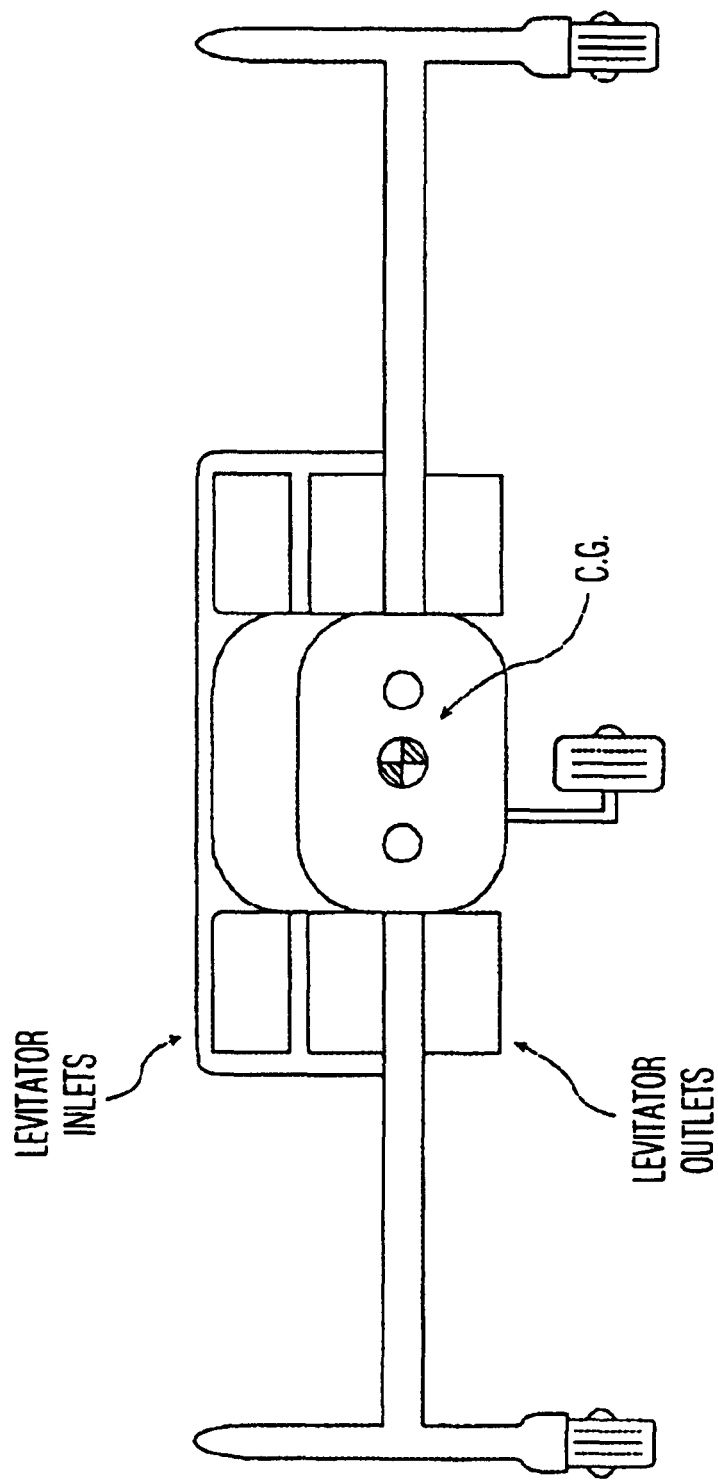
FIG. 19 is a front view of a PAC similar to that of FIG. 14 but with two ducted fan units on each wing arranged back to back.
Figure 20:
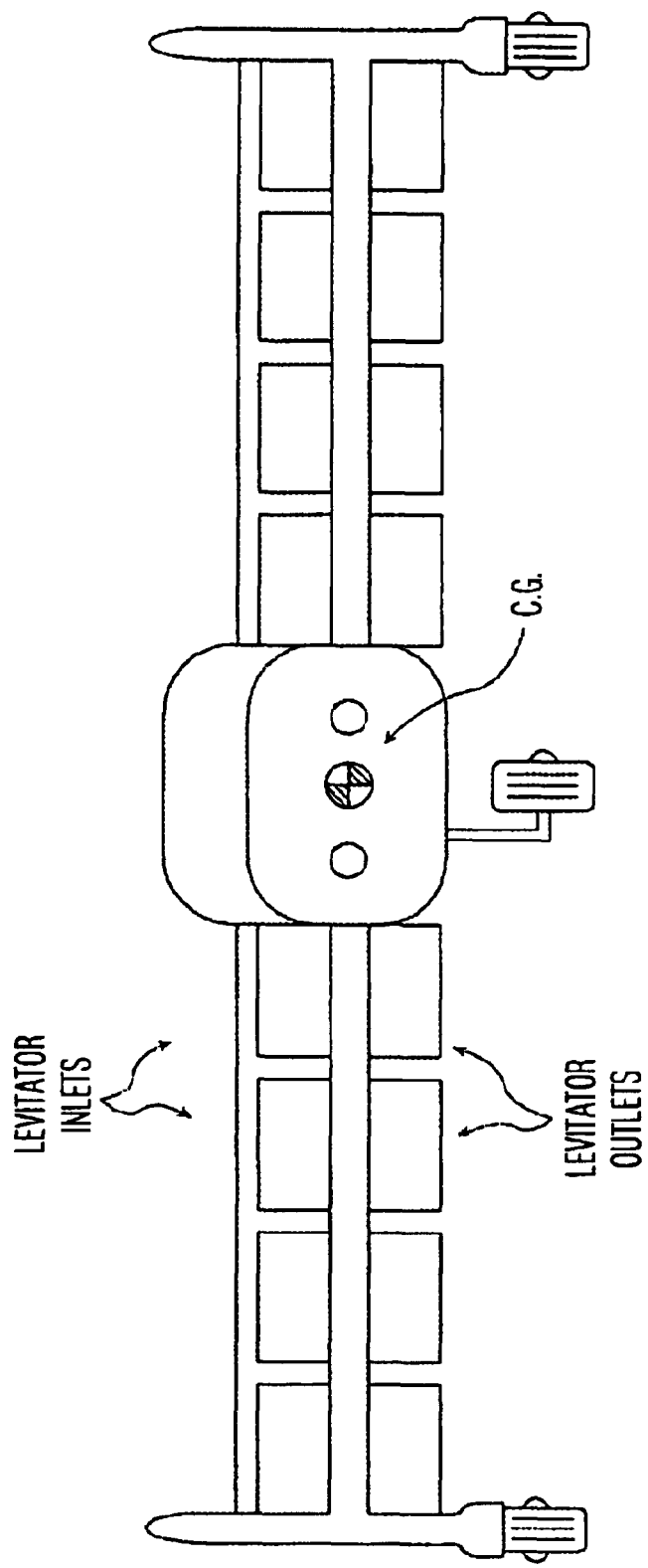
FIG. 20 is a front view of a PAC similar to that of FIG. 14 but with four ducted fan units on each wing arranged side by side.
Figure 21:
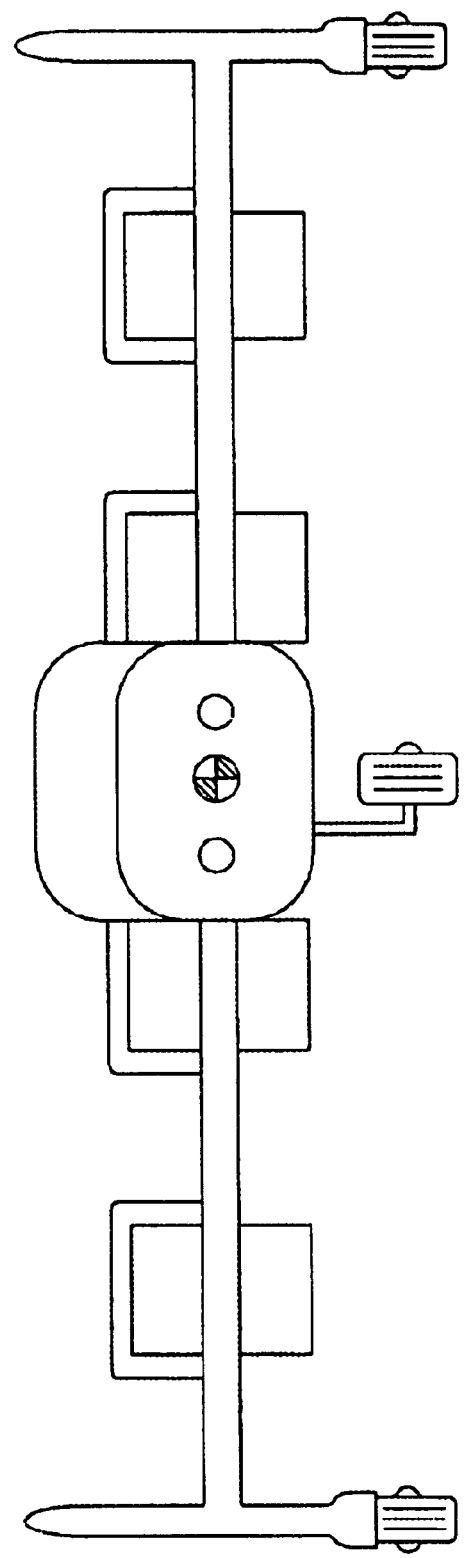
FIG. 21 is a front view of a PAC similar to that of FIG. 14 but with two ducted fan units on each wing arranged side by side.

Additional PAC Embodiments: FIGS. 19–22 show alternative embodiments wherein the number and position of the multiple levitators is varied. In FIG. 19, two siamesed levitators are provided back to back, on each side of the fuselage. In FIG. 20, four levitators are arranged on each side of the fuselage, side by side along the wing. In FIG. 21, the number of levitators on each side is reduced to two. Alternatively, it would be possible to provide three levitators on each side, instead of two. Finally, in FIG. 22, only one levitator is provided on each side of the fuselage. This simplifies the design, but if one of the levitators were to fail while hovering, the craft would fall out of control.

Figure 22:
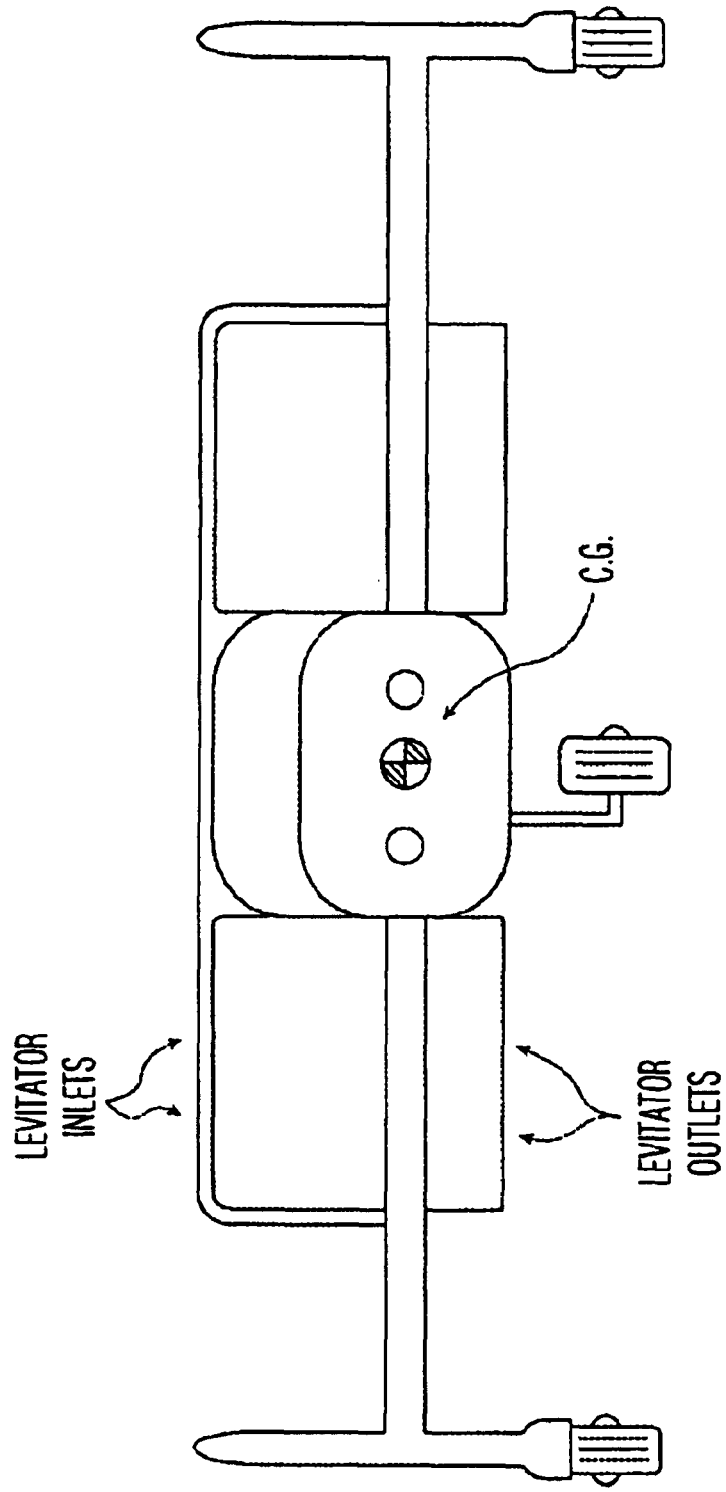
FIG. 22 is a front view of a PAC similar to that of FIG. 14 but with one ducted fan unit arranged on each wing.
Figure 23:
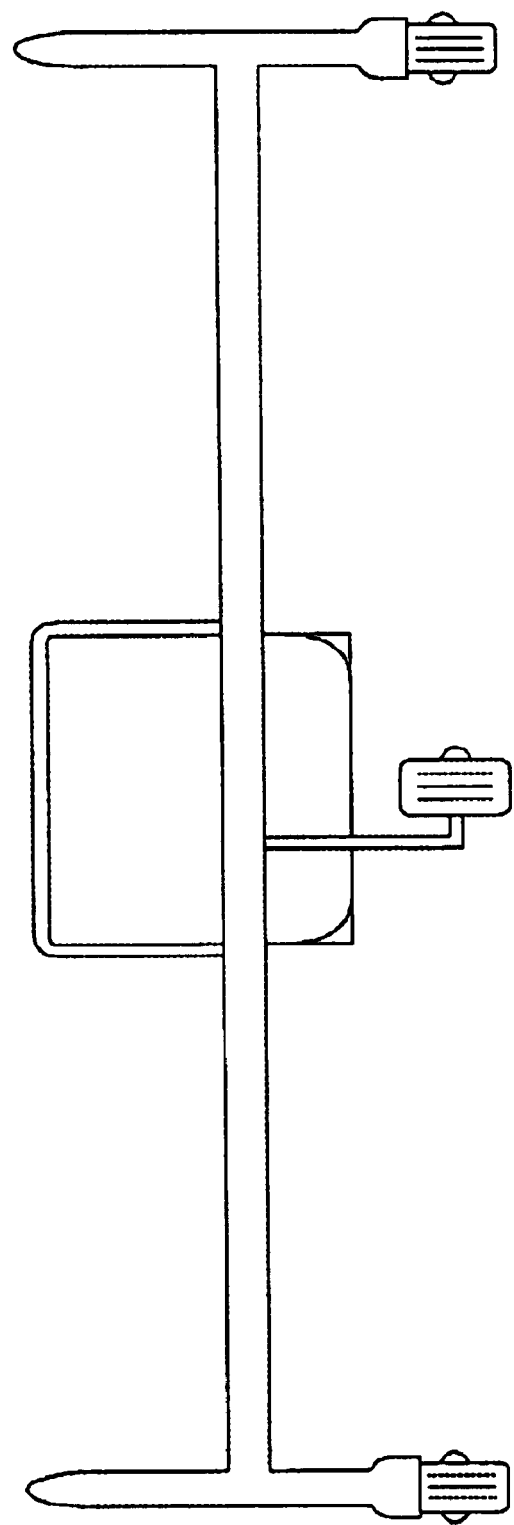
FIG. 23 is a front view of a PAC similar to that of FIG. 14 but with one large ducted fan unit located centrally between the wing tips.

FIG. 23 shows an aircraft configuration, similar to that of FIG. 22 but without a fuselage/passenger compartment. In this configuration, which may be flown as a drone, only one levitator is provided.

Figure 24:
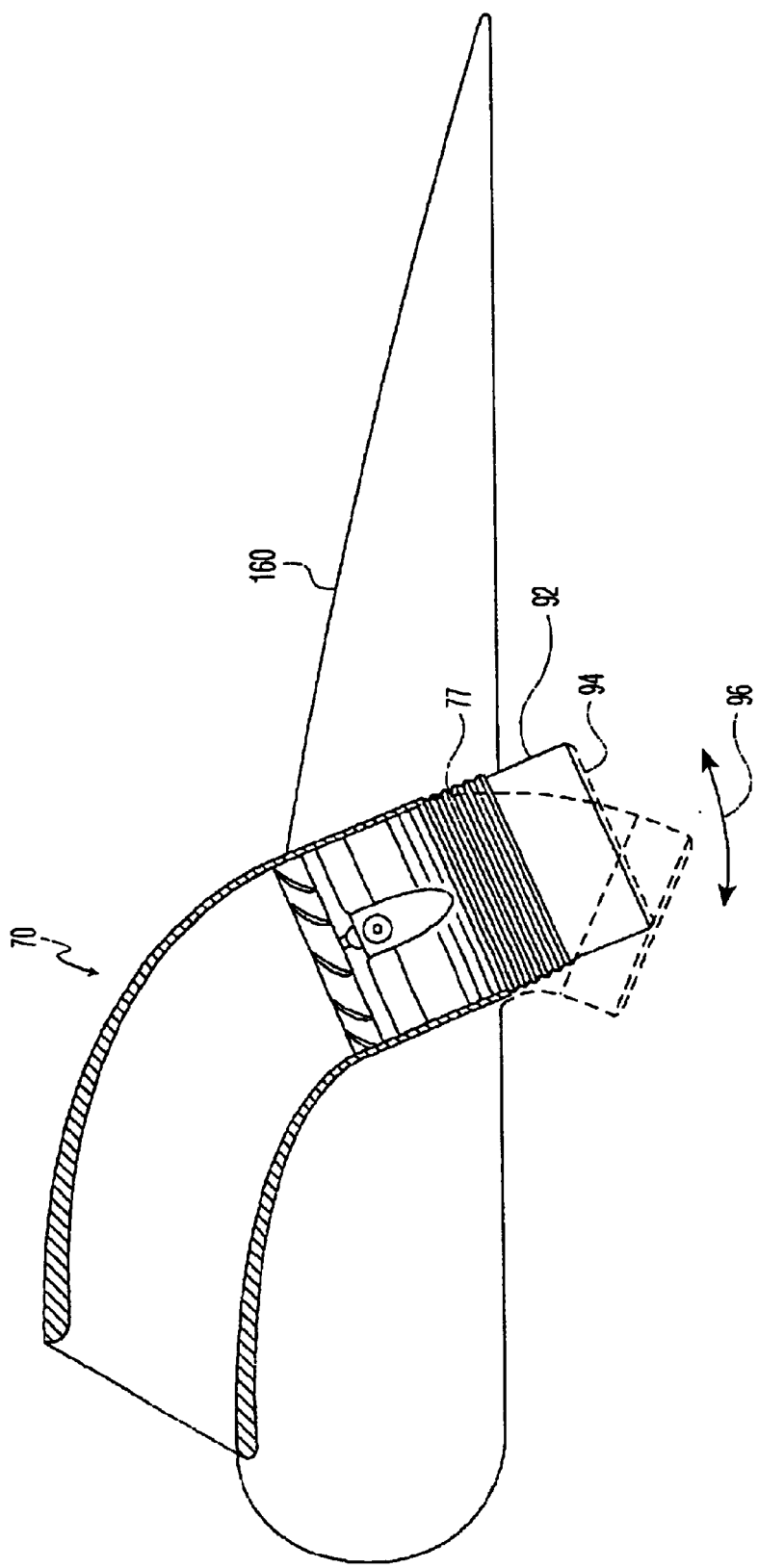
FIG. 24 is a cross-sectional view of a wing, showing the relative position of a ducted fan unit according to one embodiment of the invention.
Figure 25:
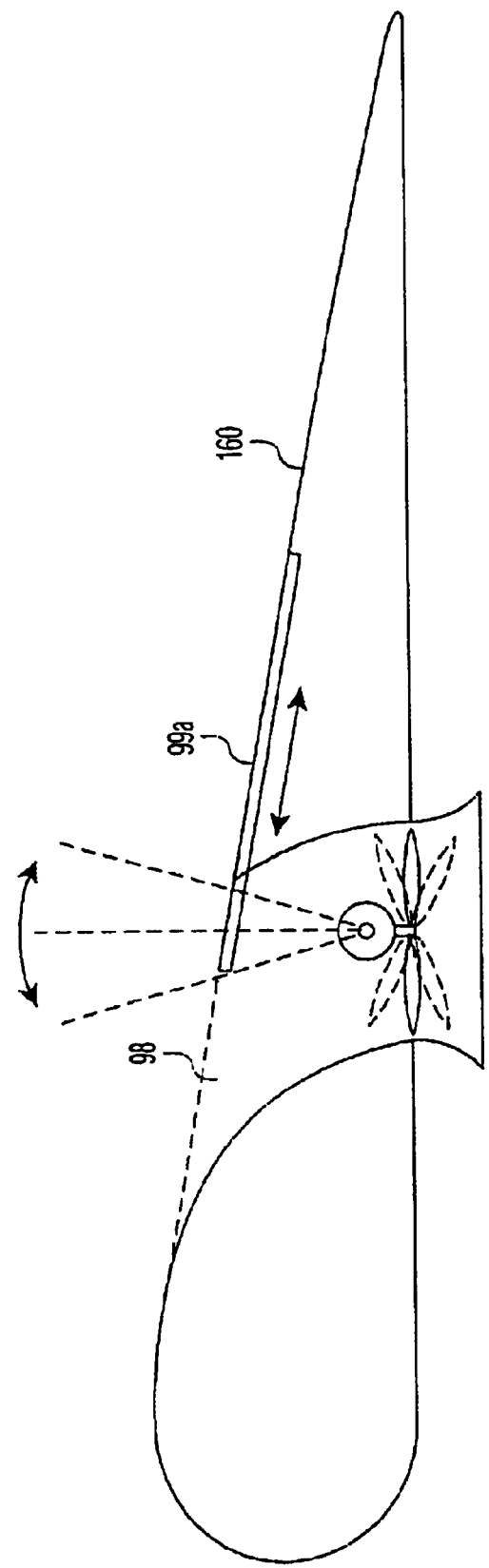
FIG. 25 is a cross-sectional view of a wing showing the relative position of a ducted fan unit according to another embodiment of the invention.
Figure 26:
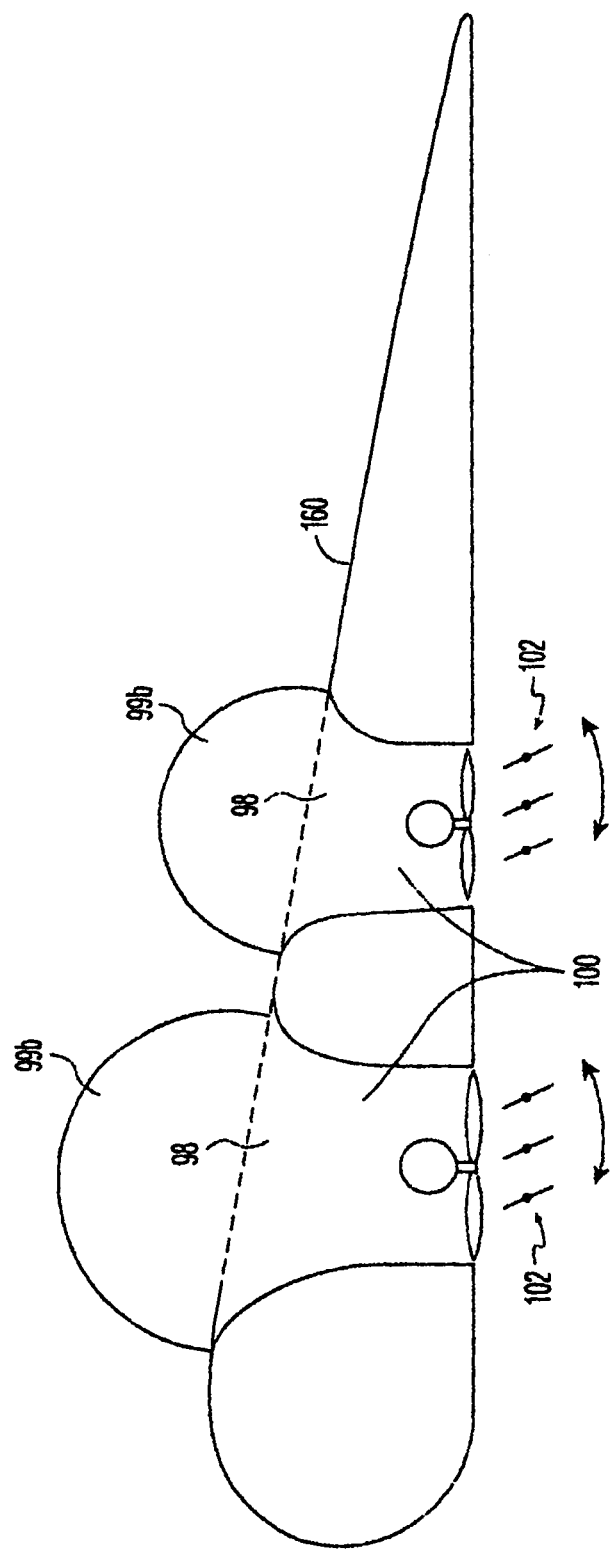
FIG. 26 is a cross sectional view of a wing showing the relative positions of two ducted fans according to another embodiment of the invention.

FIGS. 24–26 show how one or more ducted fan units may by integrated into an aircraft wing and used to control the aircraft during hovering and VTOL operation.

FIG. 24 is a cross-sectional view showing how a levitator 70 of the type shown in FIGS. 9–11 may be integrated into an aircraft wing 160. As may be seen, the outlet 94 of the levitator section 92, which includes the bellows 77, may be articulated forward or backward in the direction shown by the arrows 96 to direct the outlet stream of air and thus control the attitude of the aircraft.

FIG. 25 shows an alternative embodiment, similar to that of FIG. 24 with the inlet passage removed. In this embodiment, the air enters an opening 98 on the top surface of the wing 160 which may be selectively opened or closed by a moveable panel 99.

Alternatively, the inlet 98 through the ducted fan may be opened and closed by semicircular flaps of the type disclosed in the U.S. Pat. No. 3,618,875 to Kappus. In the open position, the flaps form a vertical fin aligned in the forward direction of travel of the aircraft.

FIG. 25 shows how the axis of rotation of the impeller may be varied to control the attidude of the aircraft. In this embodiment, the impeller, and perhaps also the prime mover which drives the impeller, is arranged on a gimbal and means (hydraulic, electric or otherwise) are provided to control the orientation of the impeller axis.

FIG. 26 shows still another embodiment wherein two ducted fan units 100 are integrated into the wing 160, one ahead of the other in the direction of forward travel of the aircraft. In this case, the forward ducted fan unit has a larger diameter than the one in the rear; however, it will be understood that these ducted fan units can also have the same diameter. The relative thrust produced by the forward and the rearward D-F units is used to control the pitch of the aircraft.

Instead of a panel 99 of the type shown in FIGS. 25, the D-F units may be opened and closed by semicircular flaps of the type disclosed in the aforementioned U.S. Pat. No. 3,681,875.

Instead of employing an articulated outlet duct of the type shown in FIGS. 24 and 25, the outlet airstream may be deflected by a plurality of louvers 102 to control the attitude of the aircraft.

Figure 27:
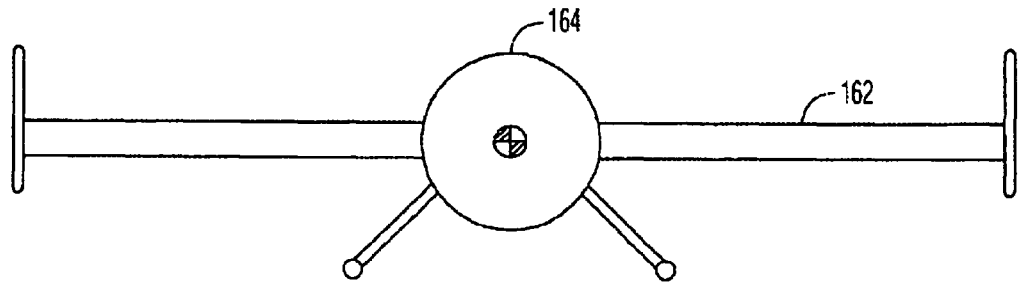
FIG. 27 is a front view of a PAC according to a fourth preferred embodiment of the invention.
Figure 28:
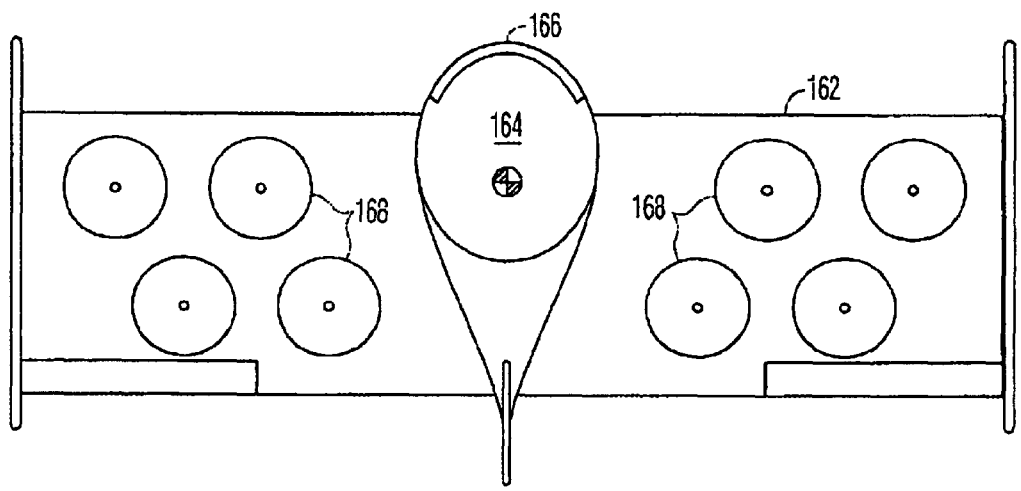
FIG. 28 is a top view of the PAC of FIG. 27.
Figure 29:
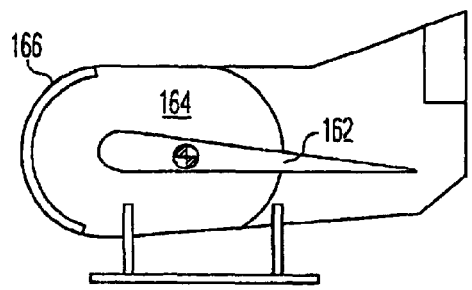
FIG. 29 is a side view of the PAC of FIG. 27.

FIGS. 27, 28 and 29 show, respectively, the front, top and side views of a fourth preferred embodiment of the personal aircraft according to the present invention. In this embodiment, a single wing 162, which is approximately 24 feet from wing tip to wing tip, is attached to a fuselage 164 approximately midway between its top and bottom. In order for the pilot and passengers to gain entrance and egress to and from the fuselage, a circular, convex door 166 is provided at the front of the vehicle, similar to that of the "Isetta" automobile manufactured by BMW during the 1950s.

As may be seen in the top view, FIG. 28, a plurality of ducted fan units 168 are integrated into the wing 162. In FIG. 28, a total of eight D-F units are shown, four on each side of the fuselage. These are arranged in two transverse rows, one ahead of the other in the direction of forward flight of the aircraft. This arrangement permits control of the aircraft pitch (nose up or nose down) by controlling the thrust of the forward D-F units as compared to the thrust of the rearward D-F units.

Figure 30:
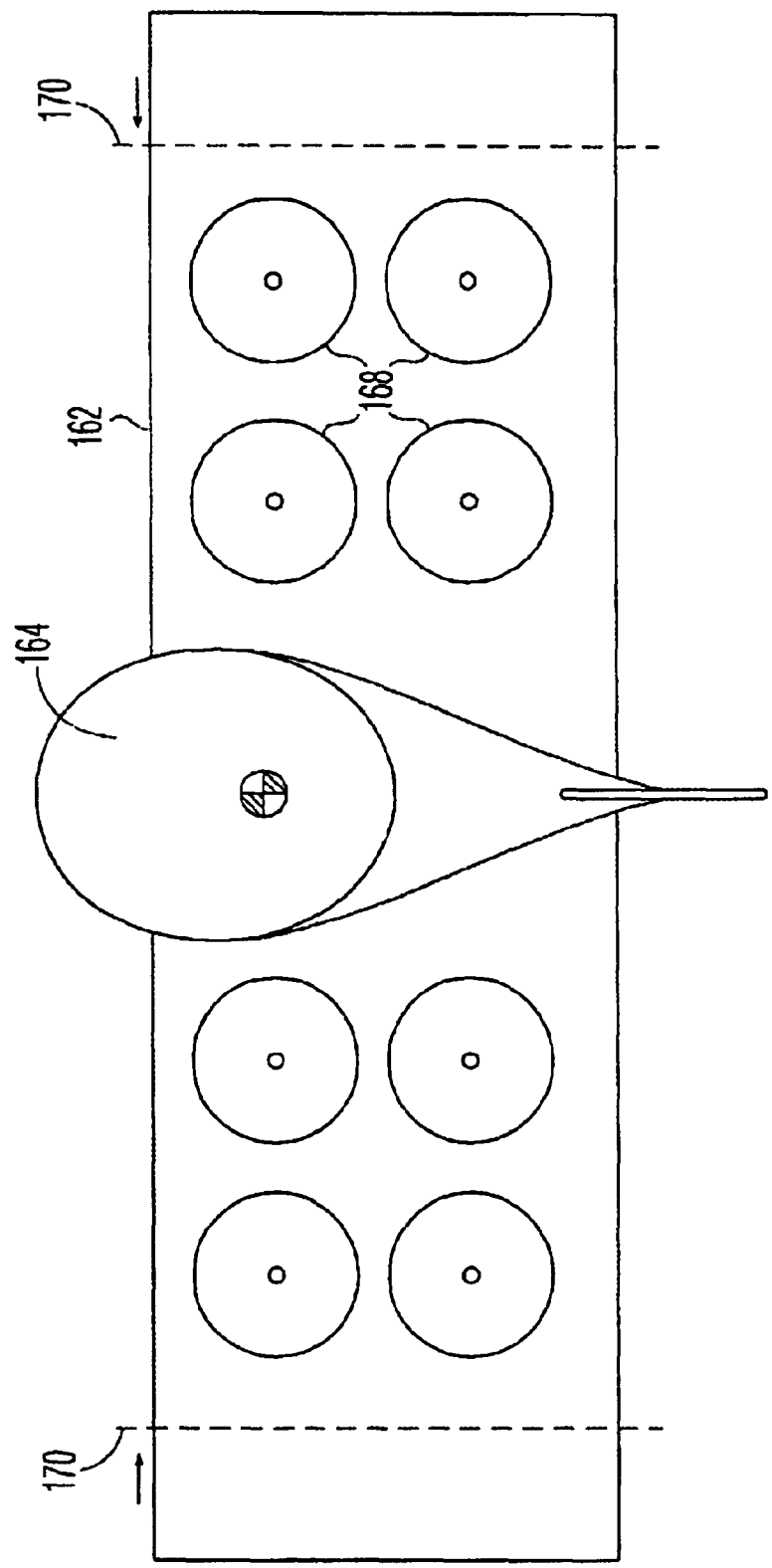
FIG. 30 is a top view of the PAC of FIG. 27, with the ducted fans in an alternative configuration.
Figure 31:
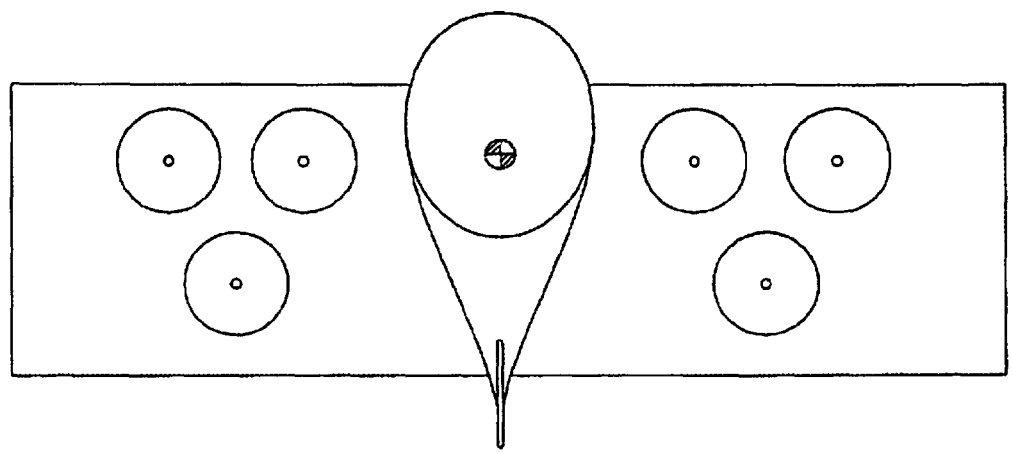
FIG. 31 is a top view of the PAC of FIG. 27, with the ducted fans in another alternative configuration.
Figure 32:
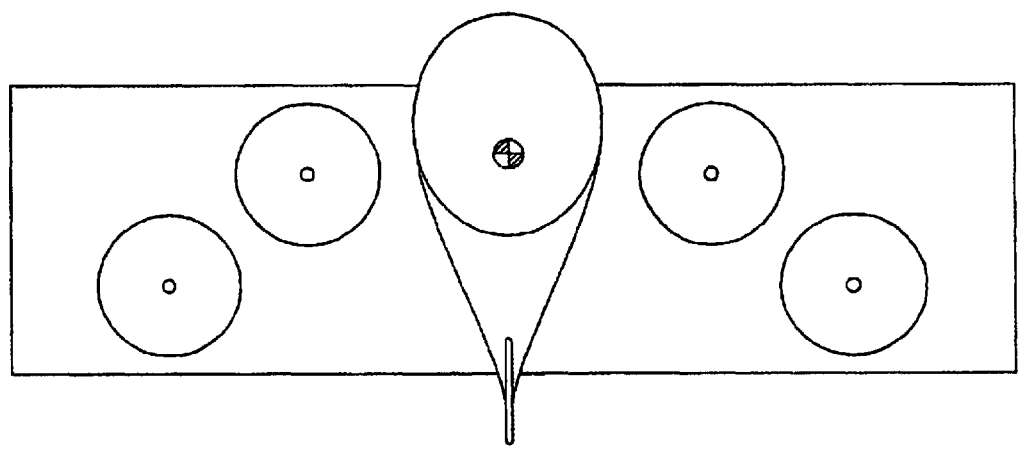
FIG. 32 is a top view of the PAC of FIG. 27, with the ducted fans in still another alternative configuration.

FIGS. 30–32 illustrate several of alternative configurations of the D-F units 168 in the wing 162. In FIG. 30, the D-F units in the two rows are aligned in rectangular orientation to permit a reduction in the wingspan, as shown in dashed lines 170. In FIG. 31, only six ducted fan units are provided, three on each side of the fuselage. In FIG. 32, only four, large diameter ducted fan units are provided, two on each side of the fuselage.

In all of the embodiments shown in FIGS. 27–32, the ducted fan units are shown as having the same diameter. As is indicated with the configuration shown in FIG. 26, the diameters of these various DF units may vary.

Also, it is assumed that each ducted fan unit is independently forwarded by its own prime mover. Alternatively, two or more D-F units may be powered by a common engine.

Figure 33:
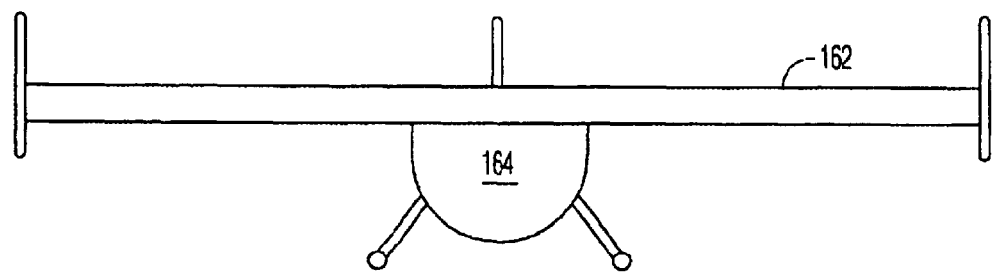
FIG. 33 is a front view of the PAC according to a fifth preferred embodiment of the invention.
Figure 34:
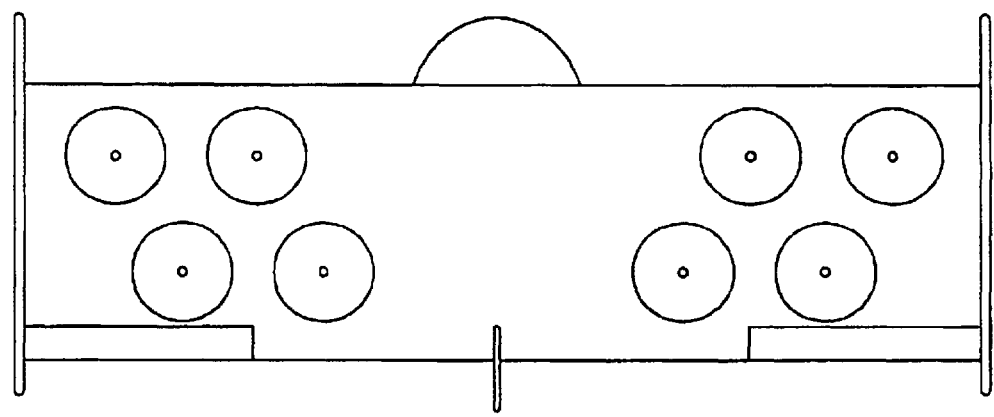
FIG. 34 is a top view of the PAC of FIG. 33.
Figure 35:
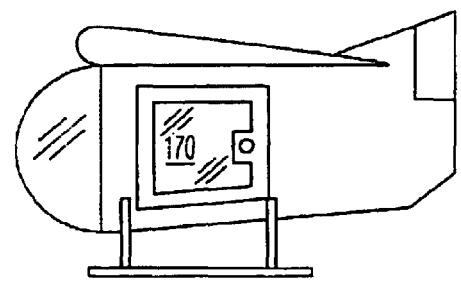
FIG. 35 is a side view of the PAC of FIG. 33.

FIGS. 33–35 illustrate a fifth an final embodiment of the personal aircraft according to the present invention. In this embodiment, the wing 162 is arranged at the top of the fuselage 164. This allows entrance and egress of the pilot and passengers through a door 170 on one or both sides of the fuselage.

PAC Control System: A "fly-by-wire" control system may be used in the PAC of this preferred design. Using well-proven piezoelectric gyroscopes and digital proportional control of servomotors, much mechanical complexity can be avoided in the PAC's control system. The "gyros", operating as they do in an oscillatory mode, are free from the precession problems that affect rotating gyroscopes, and will permit the PAC's pilot to concentrate his/her attention on vital flight tasks such as accurate, gentle landing, without having to simultaneously compensate for turbulence (ambient or self-induced by close-to-the-ground outflow from the Levitators).

A further advantage of employing a "fly-by-wire" control system in conjunction with piezoelectric gyro sensors and a computerized central module is that this system can be programmed so as to prevent the PAC from being deliberately maneuvered into hazardous attitudes. Such a system would prevent all "aerobatic" maneuvering, and also restrict the attainable "angles of attack" of the vehicle to a safe range, where aerodynamic stalling cannot occur.

Flight controls must include provisions for directional, longitudinal ("pitch"), velocity, and altitude variations. They may include a means of lateral ("banking") control, but this does not seem vital: close to the ground a level attitude is called for; and in-flight banking can be made automatic by the interactions of aerodynamic forces as the PAC's direction of flight is changed.

A "quadrant" type of pilot's control could be set up as follows: Turning the quadrant from side to side causes a change in direction. Pulling it back causes a reduction in forward speed or a complete stop in mid-air, while pushing the quadrant forward makes the PAC accelerate. Power changes may be made by twist-grips (as on motorcycle handlebars) on the quadrant ends. The various Levitator unit power and exit duct position adjustments can be computer-controlled in accordance with the control inputs provided by the pilot's control commands combined with the piezoelectric gyro outputs.

PAC Airframe—Structural Considerations: Because of the many compound curves required by the proposed PAC configuration, probably the most practical constructional technique would be "composite construction", using the general "lost foam" technique employed by Burt Rutan in his various aircraft designs (e.g. the "Quickie"). An internal frame of welded metal tubing could be also used to provide a rigid central mounting for the pilot/passenger compartment, fuel tanks, cargo compartment, and Levitator units. In production, these various elements may be of molded design.

The structural design of the PAC should provide "crushability" as a protective feature to minimize injury to PAC passengers in impacts. Also, the wheels need not be retractable. At cruising speeds of 50 mph and less, the drag from these wheels will not be high, and their protrusion from the bottom can provide extra impact absorption.

Folding wings for this airframe configuration is probably impractical.

Access hatches must be provided for maintenance and inspection purposes. Federal Aircraft Regulations—FARs—will probably mandate such hatches. This may seem to be a minor consideration, but it is possible that hatches required for adequate access to the engines may affect the structural integrity of the contemplated "monocoque" design, and thus require additional internal stress-bearing components.

PAC Airframe—Further Considerations: Inasmuch as the proposed PAC is a man-carrying flying machine, its operation in flight will undoubtedly come under FAR restrictions. Two-way radio; some form of electronic navigation system; and basic aircraft flight instrumentation will be needed as a minimum. Operation of the PAC may be restricted, initially, to Visual Flight Rules (VFR), which will prohibit flight after dark or in marginal weather conditions.

Also, licensing of both the vehicle and its operator(s) will probably be required by law. FAR's have taken much of the former freedom away from experimental aircraft. On the other hand, Burt Rutan has shown that new and unorthodox aircraft can be developed and flown on a daily basis by "average pilots". It is a primary object of the present invention to provide a VTOL aircraft or PAC which is extremely easy and, above all, safe to fly.

There has thus been shown and described a novel personal aircraft (PAC), and a levitator therefor, which fulfill all the objects and advantages sought by the invention. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A personal aircraft (PAC) capable of vertical take-off and landing (VTOL) and having a center of gravity, said aircraft comprising, in combination:
   (a) a fuselage forming a passenger compartment and having a four sides, including a front side, a rear side and two lateral sides, said fuselage defining a central longitudinal axis of said aircraft;
   (b) fixed wing having a leading edge and a trailing edge, said wing being attached to the fuselage and extending outward with respect to said two lateral sides at a longitudinal position along said central axis of said aircraft such that the center of gravity of said aircraft is between said leading edge and said trailing edge;

(c) a plurality of thrusters, each comprising a thruster outlet duct and being attached to said wing, said thrusters being capable of providing both vertical lift and horizontal thrust to said aircraft, said thrusters being movable, between a first position in which they provide vertical lift and a second position in which they provide horizontal thrust;

wherein the lift-to-drag ratio of the aircraft resulting from forward motion of the craft through the air and excluding vertical lift provided by said thrusters is greater than 4:1 with the aircraft flying at a cruising speed in the range of 50 to 100 MPH.

2. The PAC defined in claim 1, wherein two or more thrusters are arranged on each opposite side of said fuselage.

3. The PAC defined in claim 2, wherein at least three thrusters are arranged on each opposite side.

4. The PAC defined in claim 1, wherein two or more thrusters are arranged on each opposite side along a straight line.

5. The PAC defined in claim 1, wherein the thrust of each of said thrusters is independently controllable.

6. The PAC defined in claim 1, wherein at least one of said thrusters on each side may be controlled to adjust the direction of thrust.

7. The PAC defined in claim 6, wherein an outlet of said at least one thruster is a tube for directing the flow of air, and wherein said direction of thrust is controlled by moving said tube.

8. The PAC defined in claim 6, wherein said at least one thruster has a rotatable impeller defining an impeller axis, and wherein said direction of thrust is controlled by tilting said impeller axis.

9. The PAC defined in claim 1, further comprising an additional independently powered thruster attached to said fuselage at one of said front side and said rear side thereof for directing thrust in at least one of a forward and rearward direction of the craft.

10. The PAC defined in claim 1, wherein said thrusters are disposed in said wing between said leading edge and said trailing edge.

11. The PAC defined in claim 1, wherein said wing is at least one of foldable and extendable toward and away from said fuselage, thereby to respectively reduce its length for storage and increase its length for operation.

12. The PAC defined in claim 1, wherein each of said ducted fan units includes a duct having an inlet and an outlet and an impeller for driving air through said duct from said inlet to said outlet.

13. The PAC defined in claim 12, wherein each of said ducted fan units further includes a prime mover for rotating said impeller.

14. The PAC defined in claim 1, wherein at least one of the thrusters on each opposite side of the compartment comprises ducted fan apparatus including:

(1) a cylindrical first tube having an inlet, an outlet and a linear, first central axis which is disposed at an angle to the vertical when said craft is oriented in its normal upright position such that the inlet is located forward of the outlet, in relation to the direction of travel of said aircraft;

(2) a first impeller disposed in said first tube and arranged to rotate about said first central axis to generate airflow from the inlet to the outlet;

(3) a first prime mover coupled to drive said first impeller; and (4) a second tube having an inlet and an outlet, the outlet of said second tube having substantially the same internal cross-sectional diameter area as that of said first tube, the outlet of said second tube extending into the inlet of said first tube, the inlet of said second tube facing forward in relation to said direction of travel and having a substantially horizontal, second central axis.

15. The PAC defined in claim 14, wherein said first prime mover is disposed in said first tube adjacent to said first impeller.

16. The PAC defined in claim 15, wherein said first prime mover is mounted on a plurality of stator blades which constrain air to flow through said first tube in the direction of said first central axis.

17. The PAC defined in claim 15, wherein said first prime mover is an internal combustion engine.

18. The PAC defined in claim 17, wherein the internal combustion engine has an intake port for the intake of air, said intake port being disposed outside of said first tube.

19. The PAC defined in claim 14, wherein said ducted fan apparatus further comprises a third tube having an inlet and an outlet, the inlet of said third tube being substantially cylindrical and having substantially the same internal diameter as that of said first tube, the outlet of said first tube extending into the inlet of said third tube.

20. The PAC defined in claim 19, wherein the outlet of said third tube has a circular cross section.

21. The PAC defined in claim 19, wherein the outlet of said third tube has a third central axis, and wherein said apparatus further includes means for adjusting the orientation of said third central axis with respect to that of said first central axis, thereby adjusting the direction of outflow of air.

22. The PAC defined in claim 21, wherein said third tube has at least one of a flexible and an articulated portion arranged between the inlet and outlet thereof to allow for the adjustment of orientation of said third central axis.

23. The PAC defined in claim 14, further comprising a second impeller disposed in said first tube and arranged to rotate about said first central axis in a direction opposite to the direction of rotation of said first impeller, said second impeller serving to redirect the air to flow in the axial direction within said first tube and to increase the speed of air at the outlet of said first tube.

24. The PAC defined in claim 23, wherein said first prime mover drives both said first and said second impeller.

25. The PAC defined in claim 23, further comprising a second prime mover coupled to drive said second impeller.

26. The PAC defined in claim 25, wherein said second prime mover is disposed in said first tube adjacent to said second impeller.

27. The PAC defined in claim 26, wherein said second prime mover is coupled to said first prime mover to rotate in synchronism in opposite direction.

28. The PAC defined in claim 26, wherein the second prime mover is a second internal combustion engine having an intake port for the intake of air, said intake port being disposed outside of said first tube.

29. The PAC defined in claim 14, wherein the inlet of said second tube has a circular opening.

30. The PAC defined in claim 14, wherein the inlet of said second tube has a substantially rectangular opening, said opening having upper and lower substantially horizontal edges and two side edges.

31. The PAC defined in claim 30, wherein the upper edge of the opening in the inlet of said second tube has an aerodynamic contour which produces lift due to airflow into such inlet.

32. The PAC defined in claim 30, wherein the lower edge of the opening in the inlet of said second tube has an aerodynamic contour which produces lift due to airflow into such inlet.

33. The PAC defined in claim 14, wherein the inlet of said second tube has at least one edge surrounding an inlet opening, said edge defining a substantially planar face of the inlet which forms an acute angle with respect to said second central axis.

34. The PAC defined in claim 33, wherein said acute angle is in the range of 35 to 55 degrees.

35. The PAC defined in claim 34, wherein said acute angle is substantially 45 degrees.

36. The PAC defined in claim 14, further comprising second ducted fan apparatus, substantially identical to said apparatus defined in claim 15, disposed adjacent to said apparatus defined in claim 15, with the inlets of the second tubes thereof disposed one above the other.

37. The PAC defined in claim 14, further comprising second ducted fan apparatus, substantially identical to said apparatus defined in claim 15, disposed adjacent to said apparatus defined in claim 15, with the inlets of the second tubes thereof disposed laterally adjacent each other.

38. The PAC defined in claim 14, wherein said first axis is disposed at an angle to the vertical in the range of 15 to 35 degrees.

39. The PAC defined in claim 1, wherein said passenger compartment is configured as a lifting body, to provide lift to the craft during forward motion through the air.

40. The PAC defined in claim 1, wherein said passenger compartment has a top and a center of gravity, said PAC further comprising a parachute arranged at the top, in substantially vertical alignment with the center of gravity, for deployment in the event of thruster failure.

41. The PAC defined in claim 1, wherein said passenger compartment has a bottom and a center of gravity, said PAC further comprising an airbag arranged at on the bottom, in substantially vertical alignment with the center of gravity, for deployment in the event of thruster failure.

42. A vertical take-off and landing aircraft comprising, in combination:
(a) a horizontal fixed wing having two ends and an upper wing surface and a lower wing surface;
(b) a fuselage disposed on said wing substantially midway between said two ends; and
(c) an even number of thrusters, each arranged in and integrated into said wing, with the same number of thrusters on each side of said fuselage, to direct air from said upper surface to said lower surface of said wing, each thruster including:
(1) an inlet at or above said upper surface;
(2) an outlet at or below said lower surface;
(3) a circular air duct disposed between said inlet and said outlet;
(4) an impeller disposed in said air duct for directing and accelerating air from said inlet to said outlet; and
(5) a prime mover connected to drive said impeller;
wherein the lift-to-drag ratio of the aircraft resulting from forward motion of the craft through the air and excluding vertical lift provided by said thrusters is greater than 4:1 with the aircraft flying at a cruising speed in the range of 50 to 100 MPH, and
wherein said thrusters, including the prime movers thereof, are movable between a first position in which they provide vertical lift and a second position in which they provide horizontal thrust.

43. The aircraft defined in claim 42, comprising at least four thrusters arranged in said wing, with two thrusters arranged on each side of said fuselage.

44. The aircraft defined in claim 42, comprising at least six thrusters arranged in said wing, with three thrusters arranged on each side of said fuselage.

45. The aircraft defined in claim 42, comprising at least eight thrusters arranged in said wing, with four thrusters arranged on each side of said fuselage.

46. The aircraft defined in claim 42, wherein said thrusters are arranged along at least one straight line which extends from one end of said wing to the other.

47. The aircraft defined in claim 46, wherein said thrusters are arranged along at least two straight lines which extend from one end of said wing to the other.

48. The aircraft defined in claim 47, wherein said two lines are parallel.

49. The aircraft defined in claim 42, wherein the lift to drag ratio is in the range of 4:1 to 10:1.

50. In an aircraft comprising a fuselage with a longitudinal fuselage axis and an elongate fixed wing having a longitudinal wing axis extending transversely to said fuselage axis, an upper surface, a lower surface and a cross-sectional profile, transverse to said wing axis, forming a wing airfoil, the improvement comprising a plurality of ducted fan units arranged in said wing, each ducted fan unit having a impeller, rotatable about an impeller axis, and a circular duct arranged concentrically with said impeller axis and surrounding said impeller, said circular duct having an outlet opening with a central axis, and means for varying the direction of said impeller axis to vary the direction of thrust of said ducted fan unit, whereby the pitch of the aircraft may be controlled by varying the direction of thrust of said ducted fan units,
wherein the lift-to-drag ratio of the aircraft resulting from forward motion of the craft through the air and excluding vertical lift provided by said ducted fan units is greater than 4:1 with the aircraft flying at a cruising speed in the range of 50 to 100 MPH, and
wherein said thrusters, including the impeller axis thereof, are movable between a first position in which the provide vertical lift and a second position in which they provide horizontal thrust.

51. In an aircraft comprising a fuselage with a central longitudinal axis and an elongate fixed wing having a longitudinal wing axis extending transversely to said central axis, an upper surface, a lower surface and a cross-sectional profile, transverse to said wing axis, forming a wing airfoil, the improvement comprising a plurality of ducted fan units arranged in said wing, each ducted fan unit having a impeller, rotatable about an impeller axis, and a circular duct arranged concentrically with said impeller axis and surrounding said impeller, at least some of said ducted fan units having means for controlling the angle of the impeller axes thereof with respect to the vertical, whereby components of thrust may be imparted to said aircraft in the vertical direction and in a direction transverse to the vertical, and wherein the lift-to-drag ratio of the aircraft resulting from forward motion of the craft through the air and excluding vertical lift provided by said ducted fan units is greater than 4:1 with the aircraft flying at a cruising speed in the range of 50 to 100 MPH.

52. In an aircraft comprising (a) a fuselage with a central, longitudinal, fuselage axis extending through a center of gravity of the aircraft, and (b) an elongate fixed wing having a longitudinal wing axis extending transversely to the direction of said fuselage axis and extending in the direction of said fuselage axis, from a leading edge to a trailing edge, both in front of and behind said center of gravity, said wing having an upper surface, a lower surface and a cross-sectional profile, transverse to said wing axis, forming a wing airfoil, the improvement comprising a plurality of ducted fan units arranged in said wing, each ducted fan unit having a impeller, rotatable about an impeller axis, and a circular duct arranged concentrically with said impeller axis and surrounding said impeller, said circular duct having an inlet opening surfaces which extend smoothly into said upper surface of said wing, wherein the lift-to-drag ratio of the aircraft resulting from forward motion of the craft through the air and excluding vertical lift provided by said ducted fan units is greater than 4:1 with the aircraft flying at a cruising speed in the range of 50 to 100 MPH, and wherein said ducted fan units, including the impeller axes thereof, are movable between a first position in which they provide vertical lift and a second position in which they provide horizontal thrust.

53. In an aircraft comprising a fuselage with a central longitudinal axis and an elongate fixed wing having a longitudinal wing axis extending transversely to said central axis, an upper surface, a lower surface and a cross-sectional profile, transverse to said wing axis, forming a wing airfoil, the improvement comprising a plurality of ducted fan units arranged in said wing, each ducted fan unit having a impeller, rotatable about an impeller axis, and a circular duct arranged concentrically with said impeller axis and surrounding said impeller, at least some of said ducted fan units having an impeller axis disposed at an angle with respect to the vertical, whereby components of thrust may be imparted to said aircraft in the vertical direction and in a direction transverse to the vertical, wherein the lift-to-drag ratio of the aircraft resulting from forward motion of the craft through the air and excluding vertical lift provided by said ducted fan units is greater than 4:1 with the aircraft flying at a cruising speed in the range of 50 to 100 MPH, and wherein said ducted fan units, including the impeller axes thereof, are movable between a first position in which they provide vertical lift and a second position in which they provide horizontal thrust.

54. The aircraft defined in claim 53, wherein said angle of said impeller axis with respect to the vertical is adjustable, to adjust the direction of thrust of said ducted fan unit, between zero degrees and an angle greater than zero degrees.

55. The aircraft defined in claim 1, wherein the ducted fan units are equal to or less than about 5 feet in diameter.

56. The aircraft defined in claim 55, wherein the ducted fan units have a diameter in the range of 2 to 5 feet.

57. In a personal aircraft (PAC) capable of vertical take-off and landing (VTOL) and comprising, in combination:

(a) a passenger compartment having a four sides, including a front side, a rear side and two lateral sides;

(b) at least two thrusters arranged to vertically lift and to provide horizontal thrust to said aircraft, each of said thrusters having an air impeller arranged to rotate about an impeller axis; and (c) at least one substantially horizontal wing, attached to said compartment and extending outward from said two lateral sides, said wing having a wingspan from one end thereof to the other;

the improvement wherein said wing is extendible from a first position with a first wingspan to a second position with a second wingspan which is greater than said first wingspan, wherein the lift-to-drag ratio of the aircraft resulting from forward motion of the craft through the air and excluding vertical lift provided by said at least one ducted fan unit is greater than 4:1 with the aircraft flying at a cruising speed in the range of 50 to 100 MPH, and wherein said thrusters, including the impeller axes thereof, are movable between a first position in which they provide vertical lift and a second position in which they provide horizontal thrust, whereby the wingspan, and therefore the transverse area occupied by said aircraft is variable.

58. The PAC defined in claim 57, wherein said ducted fan has a substantially vertical tube with an upper end and a lower end, wherein an impeller is arranged in said tube to move and accelerate air from said upper end to said lower end to provide direct lift to the aircraft, and wherein said tube has a tapered lip at said upper end to provide induced lift to the aircraft.

59. The aircraft defined in claim 57, wherein said at least one ducted fan is equal to or less than about 5 feet in diameter.

60. The aircraft defined in claim 42, wherein each impeller is equal to or less than about 5 feet in diameter.

61. The aircraft defined in claim 59, wherein impeller has a diameter in the range of 2 to 5 feet.

62. The aircraft defined in claim 1, wherein the lift to drag ratio is in the range of 4:1 to 10:1.

* * * * *